US010733228B2

(12) United States Patent
Jin et al.

(10) Patent No.: US 10,733,228 B2
(45) Date of Patent: Aug. 4, 2020

(54) SKETCH AND STYLE BASED IMAGE RETRIEVAL

(71) Applicant: Adobe Inc., San Jose, CA (US)

(72) Inventors: Hailin Jin, San Jose, CA (US); John Philip Collomosse, Ripley (GB)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/432,834

(22) Filed: Jun. 5, 2019

(65) Prior Publication Data
US 2019/0286647 A1  Sep. 19, 2019

Related U.S. Application Data

(62) Division of application No. 15/619,205, filed on Jun. 9, 2017, now Pat. No. 10,430,455.

(51) Int. Cl.
| G06K 9/00 | (2006.01) |
| G06F 16/532 | (2019.01) |
| G06K 9/46 | (2006.01) |
| G06K 9/62 | (2006.01) |
| G06N 3/08 | (2006.01) |
| G06N 3/04 | (2006.01) |
| G06N 5/02 | (2006.01) |

(52) U.S. Cl.
CPC ....... *G06F 16/532* (2019.01); *G06K 9/00684* (2013.01); *G06K 9/4628* (2013.01); *G06K 9/6253* (2013.01); *G06K 9/6274* (2013.01); *G06N 3/0427* (2013.01); *G06N 3/0454* (2013.01); *G06N 3/08* (2013.01); *G06N 5/022* (2013.01)

(58) Field of Classification Search
None
See application file for complete search history.

(56) References Cited

U.S. PATENT DOCUMENTS 10,042,935 B1 *  8/2018  Perkins ............... G06F 16/532
10,268,928 B2    4/2019  Jin et al.
(Continued)

OTHER PUBLICATIONS

"Supplemental Notice of Allowance", U.S. Appl. No. 15/619,205, dated Aug. 1, 2019, 2 pages.
(Continued)

*Primary Examiner* — Atiba O Fitzpatrick
(74) *Attorney, Agent, or Firm* — SBMC

(57) ABSTRACT

Sketch and style based image retrieval in a digital medium environment is described. Initially, a user sketches an object to be searched in connection with an image search. Styled images are selected to indicate a desired style of images to be returned by the search. A search request is generated based on the sketch and selected images. Responsive to the request, an image repository is searched to identify images having the desired object and styling. To search the image repository, a neural network is utilized that is capable of recognizing the desired object in images based on visual characteristics of the sketch and independently recognizing the desired styling in images based on visual characteristics of the selected images. This independent recognition allows desired styling to be specified by selecting images having the style but not the desired object. Images having the desired object and styling are returned.

20 Claims, 12 Drawing Sheets
(2 of 12 Drawing Sheet(s) Filed in Color)

(56) References Cited

U.S. PATENT DOCUMENTS

| | | | |
|---|---|---|---|
| 10,430,455 | B2 | 10/2019 | Jin et al. |
| 2012/0054177 | A1 | 3/2012 | Wang et al. |
| 2013/0097181 | A1 | 4/2013 | Sud et al. |
| 2014/0032854 | A1 | 1/2014 | Lih et al. |
| 2014/0328540 | A1 | 11/2014 | Wang et al. |
| 2018/0357259 | A1 | 12/2018 | Jin et al. |
| 2018/0357317 | A1* | 12/2018 | Santiago ............ H04N 21/4828 |
| 2018/0357519 | A1 | 12/2018 | Jin et al. |

OTHER PUBLICATIONS

"Corrected Notice of Allowability", U.S. Appl. No. 15/619,205, dated Sep. 4, 2019, 2 pages.
"Corrected Notice of Allowability", U.S. Appl. No. 15/619,205, dated Jun. 28, 2019, 2 pages.
"Non-Final Office Action", U.S. Appl. No. 15/616,776, dated Aug. 7, 2018, 10 pages.
"Notice of Allowance", U.S. Appl. No. 15/616,776, dated Dec. 5, 2018, 5 pages.
"Notice of Allowance", U.S. Appl. No. 15/619,205, dated May 8, 2019, 7 pages.
"Restriction Requirement", U.S. Appl. No. 15/619,205, dated Feb. 1, 2019, 5 pages.
Bhattarcharjee,"Query Adaptive Instance Search using Object Sketches", Proceedings of the 2016 ACM on Multimedia Conference, Oct. 1, 2016, 10 pages.
Borth,"Large-scale Visual Sentiment Ontology and Detectors Using Adjective Noun Pairs", Oct. 21, 2013, 10 pages.
Bui,"Generalization and Sharing in Triplet Convnets for Sketch based Visual Search", Computer Vision and Pattern Recognition 2016, Nov. 16, 2016, 9 pages.
Bui,"Scalable Sketch-based Image Retrieval using Color Gradient Features", 2015 IEEE International Conference on Computer Vision Workshop (ICCVW), 8 pages.
Chen,"Sketch2Photo: Internet Image Montage", ACM Transactions on Graphics (TOG)—Proceedings of ACM SIGGRAPH Asia 2009, Dec. 2009, 10 pages.
Collomosse,"Free-hand Sketch Grouping for Video Retrieval", 19th International Conference on Pattern Recognition 2008, Dec. 2008, 4 pages.
Collomosse,"Storyboard sketches for content-based video retrieval", 2009 IEEE 12th International Conference on Computer Vision, Sep. 29, 2009, 8 pages.
Crowley,"In Search of Art", In Workshop on Computer Vision for Art Analysis, ECCV, 2014., Sep. 17, 2014, 16 pages.
Csurka,"Domain adaptation for visual applications: A comprehensive survey", Retrieved at: https://arxiv.org/abs/1702.05374, Mar. 30, 2017, 46 pages.
Cui,"Fine-grained Categorization and Dataset Bootstrapping using Deep Metric Learning with Humans in the Loop", Computer Vision and Pattern Recognition (cs.CV), Apr. 11, 2016, 10 pages.
Dhar,"High Level Describable Attributes for Predicting Aesthetics and Interestingness", In Proceedings CVPR, 2011, 2011, pp. 1657-1664.
Eitz,"How Do Humans Sketch Objects?", In Proc. ACM SIGGRAPH Aug. 5, 2012, 10 pages.
Fang,"Collaborative Feature Learning from Social Media", In Proceedings of the IEEE Conference on Computer Vision and Pattern Recognition, Apr. 9, 2015, 9 pages.
Farhadi,"Describing Objects by their Attributes", In CVPR Workshops 2009, Jun. 2009, 8 pages.
Gatys,"Image Style Transfer Using Convolutional Neural Networks", In Proc. CVPR, 2016., Jun. 2016, pp. 2414-2423.
Gatys,"Texture Synthesis Using Convolutional Neural Networks", Computer Vision and Pattern Recognition (2015), Nov. 6, 2015, 10 pages.
Ginosar,"Detecting People in Cubist Art",In Lecture Notes in Computer Science (including subseries Lecture Notes in Artificial Intelligence and Lecture Notes in Bioinformatics, vol. 8925, Mar. 19, 2015, 16 pages.
Gordo,"Deep Image Retrieval: Learning global representations for image search", Computer Vision and Pattern Recognition (ECCV 2016), Jul. 28, 2016, 21 pages.
He,"Deep Residual Learning for Image Recognition", Proceedings of the IEEE conference on computer vision and pattern recognition, 2016., Dec. 10, 2015, 12 pages.
Hertzmann,"Image Analogies", Proceedings of SIGGRAPH 2001, 2001, 14 pages.
Hu,"A Performance Evaluation of Gradient Field HOG Descriptor for Sketch Based Image Retrieval", Computer Vision and Image Understanding (CVIU), 2013, Feb. 27, 2013, 17 pages.
Izadinia,"Deep Classifiers from Image Tags in the Wild", In Proc. Multimedia COMMONS, 2015, Oct. 30, 2015, 6 pages.
James,"Interactive Video Asset Retrieval using Sketched Queries", CVMP '14 Proceedings of the 11th European Conference on Visual Media Production, Nov. 14, 2014, 8 pages.
James,"ReEnact: Sketch based Choreographic Design from Archival Dance Footage", ICMR '14 Proceedings of International Conference on Multimedia Retrieval, Apr. 2014, 8 pages.
Jou,"Visual Affect Around the World: A Large-scale Multilingual Visual Sentiment Ontology", MM '15 Proceedings of the 23rd ACM international conference on Multimedia, Oct. 7, 2015, 11 pages.
Karayev,"Recognizing Image Style", Jul. 23, 2014, 20 pages.
Kovashka,"Attribute Adaptation for Personalized Image Search", In Proceedings of the IEEE International Conference on Computer Vision (ICCV), 2013, 8 pages.
Kovashka,"Attribute Pivots for Guiding Relevance Feedback in Image Search", In Proceedings of the IEEE International Conference on Computer Vision (ICCV), 2013., Dec. 1, 2013, 8 pages.
Krause,"The Unreasonable Effectiveness of Noisy Data for Fine-Grained Recognition", Computer Vision and Pattern Recognition (ECCV 2016), Oct. 18, 2016, 26 pages.
Krizhevsky,"ImageNet Classification with Deep Convolutional Neural Networks", In Advances in Neural Information Processing Systems 25, Dec. 3, 2012, 9 pages.
Lin,"Microsoft COCO: Common Objects in Context", Computer Vision and Pattern Recognition, May 1, 2014, 16 pages.
Lin,"Visualizing and Understanding Deep Texture Representations", Vision and Pattern Recognition (CVPR), Jun. 2016., Apr. 12, 2016, 9 pages.
Liu,"SSD: Single Shot MultiBox Detector", Computer Vision and Pattern Recognition (ECCV 2016), Dec. 29, 2016, 17 pages.
Marchesotti,"Discovering beautiful attributes for aesthetic image analysis", Computer Vision and Pattern Recognition IJCV, 2014, Dec. 16, 2014, 22 pages.
Mikolov,"Efficient estimation of word representations in vector space", arXiv preprint arXiv:1301.3781 (2013), Sep. 7, 2013, 12 pages.
Misra,"Seeing through the Human Reporting Bias: Visual Classifiers from Noisy Human-Centric Labels", (CVPR 2016) Computer Vision and Pattern Recognition, Apr. 12, 2016, 10 pages.
Murray,"AVA: A Large-Scale Database for Aesthetic Visual Analysis", Conference on Computer Vision and Pattern Recognition (CVPR), 2012, Jun. 2012, 8 pages.
Nguyen,"Synthesizing the preferred inputs for neurons in neural networks via deep generator networks", Nov. 23, 2016, 29 pages.
Obrador,"Towards Category-Based Aesthetic Models of Photographs", 18th International Conference: Advances in Multimedia Modeling, Jan. 4, 2012, pp. 63-76.
Patel,"Visual Domain Adaptation: A Survey of Recent Advances", IEEE Signal Processing Magazine, Oct. 1, 2014, 36 pages.
Patterson,"Sun Attribute Database: Discovering, Annotating, and Recognizing Scene Attributes", In Proc. CVPR, 2012, Jun. 16, 2012, 8 pages.
Peng,"Where do Emotions Come From? Predicting the Emotion Stimuli Map", 2016 IEEE International Conference on Image Processing (ICIP), Sep. 2016, 5 pages.
Plutchik,"The Nature of Emotions", American Scientist, 89(4), Aug. 2001, 7 pages.
Qi,"Sketch-based Image Retrieval Via Siamese Convolutional Nearal Network", 2016 IEEE International Conference on Image Processing (ICIP), Aug. 2016, 5 pages.

(56) References Cited

OTHER PUBLICATIONS

Radenovic,"CNN Image Retrieval Learns from BoW: Unsupervised Fine-Tuning with Hard Examples", Computer Vision and Pattern Recognition ECCV 2016, Sep. 7, 2016, 17 pages.
Rasiwasia,"Bridging the Gap: Query by Semantic Example", IEEE Transactions on Multimedia, vol. 9, No. 5, Aug. 2007, Aug. 2007, pp. 923-938.
Rastegari,"Multi-Attribute Queries: To Merge or Not to Merge?", 2013 IEEE Conference on Computer Vision and Pattern Recognition, Jun. 23, 2013, 8 pages.
Redmon,"You Only Look Once: Unified, Real-Time Object Detection", Computer Vision and Pattern Recognition (2016), May 9, 2016, 10 pages.
Saavedra,"Sketch based Image Retrieval using Learned KeyShapes (LKS)", Multimedia Tools and Applications, Dec. 2014, vol. 73, Issue 3,, Sep. 7, 2013, 11 pages.
Sangkloy,"The Sketchy Database: Learning to Retrieve Badly Drawn Bunnies", In Proc. ACM SIGGRAPH, 2016., Jul. 11, 2016, 12 pages.
Setia,"SVM-based Relevance Feedback in Image Retrieval using Invariant Feature Histograms", In Proc. ACM Multimedia, 2005, Jan. 2005, 4 pages.
Sun,"MagicBrush: Image Search by Color Sketch", In Proc. ACM Multimedia. IEEE, 2013., Oct. 25, 2013, 2 pages.
Szegedy,"Going deeper with convolutions", In Proceedings of IEEE Conference on Computer Vision and Pattern Recognition, Jun. 7, 2015, 9 pages.
Wang,"Contextual Visual Similarity", CVPR 2017—Computer Vision and Pattern Recognition, Dec. 8, 2016, 9 pages.
Wang,"Learning Fine-grained Image Similarity with Deep Ranking", CVPR 2014, Apr. 7, 2014, 8 pages.
Wang,"Mindfinder: image search by interactive sketching and tagging", WWW '10 Proceedings of the 19th international conference on World wide web, Apr. 30, 2010, 4 pages.
Wang,"Sketch-based 3D Shape Retrieval using Convolutional Neural Networks", CVPR 2015—Computer Vision and Pattern Recognition, Apr. 14, 2015, 9 pages.
You,"Building a Large Scale Dataset for Image Emotion Recognition: The Fine Print and the Benchmark", Artificial Intelligence (cs.AI); Computer Vision and Pattern Recognition AAAI 2016, May 9, 2016, 7 pages.
Yu,"LSUN: Construction of a Large-Scale Image Dataset using Deep Learning with Humans in the Loop", Computer Vision and Pattern Recognition (2016), Jun. 4, 2016, 9 pages.
Yu,"Sketch Me That Shoe", Jun. 28, 2016, 9 pages.
Yu,"Sketch-a-Net that Beats Humans", BMVC 2015 (oral)—Computer Vision and Pattern Recognition, Jul. 21, 2015, 12 pages.

\* cited by examiner

SKETCH AND STYLE BASED IMAGE RETRIEVAL

RELATED APPLICATION

This application is a divisional of and claims priority to U.S. patent application Ser. No. 15/619,205, filed Jun. 9, 2017, the entirety of which is incorporated by reference herein.

BACKGROUND

Content creators are increasingly creating visual artistic works in digital formats. Additionally, visual artistic works originally created with physical media are being converted to digital formats. In many scenarios, this content is contributed to or indexed for digital content repositories—making the content available to device users. As a result, the amount of artistic content available to users in digital form not only is staggeringly large, but also continues to grow. Given the amount of available content, users are unlikely to know about the entirety of this content. To this extent, search services and the content repositories themselves provide tools that allow users to search for content items having desired objects and/or visual characteristics.

Conventional techniques for searching image content involve matching text-based queries to tags (e.g., strings of text) that are associated with the images to describe the respective image content. These techniques return images having tags that match the text-based queries. Tagging can limit these techniques to a pre-defined taxonomy, however. Other conventional techniques for searching image content search according to a provided visual example. In these techniques, a user may select an image that is used as a basis for a search query. However, these techniques may simply search for near-duplicates of the selected query example (e.g., search for a similar digital photograph) or for particular instances of objects depicted in the scene (e.g., when the query example includes Notre-Dame Cathedral the search identifies other images that include Notre-Dame Cathedral). Users that search for images using such conventional techniques may not be shown images having characteristics that match the characteristics desired. Consequently, conventional image searching techniques may hamper the creation of visual artistic works.

SUMMARY

To overcome these problems, sketch and style based image retrieval is leveraged in a digital medium environment. Initially, a user sketches an object to be searched in connection with an image search, e.g., the object is sketched with a stylus via a user interface of a computing device. Additionally, the user selects styled images that indicate a desired style of the images to be returned by the image search, e.g., watercolor images are selected. A request to conduct the image search is then generated based on the sketch and the selected images. Responsive to the request, an image repository is searched to identify images having the desired object and styling. To search the image repository, a neural network is utilized that is capable of recognizing the desired object in images based on visual characteristics of the sketch and independently recognizing the desired styling in images based on visual characteristics of the selected images. This independent recognition allows desired styling to be specified by selecting images having the style but not the desired object. Images identified as having the desired object and styling are returned as search results.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Overview

Figure 1:
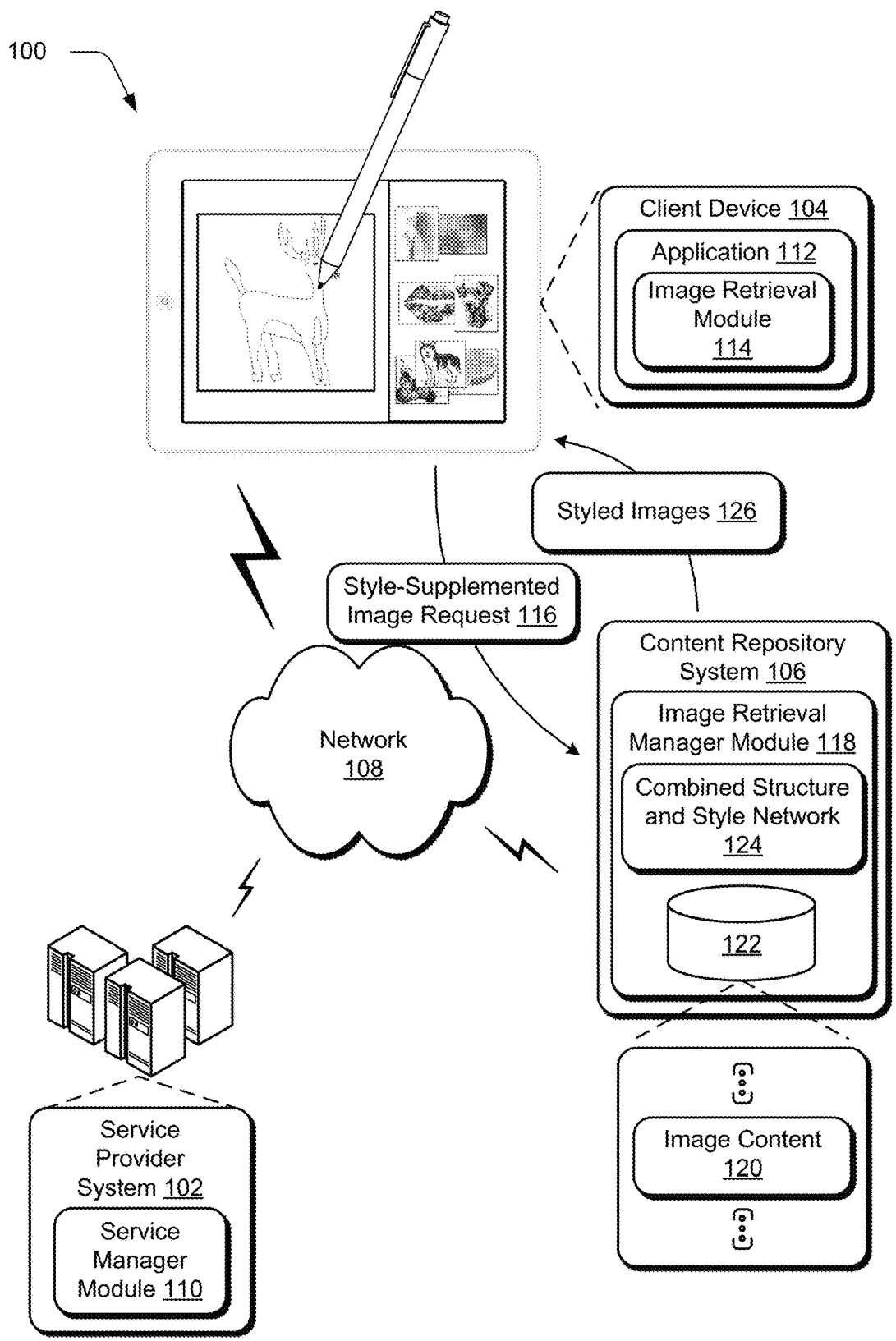
FIG. 1 is an illustration of an environment in an example implementation that is operable to employ techniques described herein.

Given the amount of artistic content available in digital form, users are unlikely to know about the entirety of this content. Consequently, search services and content repositories provide tools that allow users to search for content items having desired objects and/or visual characteristics. Conventional techniques for searching image content involve matching text-based queries to tags (e.g., strings of text) that are associated with the images to describe the respective image content. Tagging can limit these techniques to a pre-defined taxonomy, however.

Other conventional techniques for searching image content search according to a provided visual example. In these techniques, a user may select an image that is used as a basis for a search query. However, these techniques may simply search for near-duplicates of the selected query example (e.g., search for a similar digital photograph) or for particular instances of objects depicted in the scene (e.g., when the query example includes Notre-Dame Cathedral the search identifies other images that include Notre-Dame Cathedral). Users that search for images using such conventional techniques may not be presented images having characteristics that match the characteristics desired. Consequently, conventional image searching techniques may hamper the creation of visual artistic works.

To overcome these problems, sketch and style based image retrieval is leveraged in a digital medium environment. In one or more implementations, a user sketches an object to be searched in connection with an image search. For example, the user sketches an object on a user interface of a tablet device using a stylus. Additionally, the user selects styled images having a style that is desired in images returned by the image search. An image search request is then generated that specifies the object to be searched by including data indicative of the sketched object and specifies styling of the returned images by including data indicative of the selected images. In other words, the selected images supplement the sketch of the object. Consider an example in which a user sketches a deer with the stylus and selects watercolor images in accordance with one or more embodiments. In this example, watercolor images of deer may be identified and returned as search results.

To identify images having the desired object and styling, the image search request can be communicated to an image repository or some other service provider capable of searching images, such as a search engine. The service provider searches image content based on the image search request—this image content may be maintained by the service provider (as the case may be with an image repository) or simply accessible to the service provider (as the case may be with a search engine). Regardless, the service provider is configured to utilize a combined structure and style network to identify images that have both the desired object and styling. In one or more implementations, the combined structure and style network is configured as a triplet convolutional neural network that is discriminatively trained to recognize structure (e.g., objects) and style in images. By way of example, the combined structure and style network is configured to recognize a desired object in images based on visual characteristics of the sketch. The combined structure and style network is also configured to recognize, independently, a desired style in images based on visual characteristics of the selected styled images. Broadly speaking, the combined structure and style network recognizes desired objects and styling by performing a visual search (in contrast to tag-based searches) of image content, which is capable of recognizing visual characteristics of rich visual concepts that are difficult to express using text or that deviate from predefined tag ontologies. Additionally, a visual search allows users to select styled images having multiple different styles and return not only images styled in the different styles but also images in which the different styles are blended. This enables users to express fine-grained control over variations in style within a search query.

Based on the recognition, images having both the desired object (e.g., according to the user sketch) and the desired styling (e.g., according to the selected styled images) can be identified from repositories of image content. The identified images may then be returned as the search results. In one or more implementations, entire images are returned as the search results. Alternately or in addition, representations, such as thumbnails, may be returned. In such scenarios, as user may be able to select a representation to obtain the respective image. In any case, the described techniques allow users to specify image styling without requiring users to provide an exemplary image having the desired object and the desired styling. Instead, users may specify a desired object independent of specifying the styling. This may allow users to more easily search for and obtain images having a desired object that is styled in a desired manner.

Furthermore, the described techniques may also enable users to specify an object to be searched using non-sketch queries. In one or more implementations, for instance, a user may specify an object to be searched with a text query, with a selected digital photograph, or with a selected item of other digital artwork that includes a desired object. In such cases, the user can still select styled images to supplement the query and specify the styling for the returned images. By way of example, a user may enter the text string 'deer' into a user interface instrumentality and select watercolor images to supplement the query. In this example also, watercolor images of deer are identified and returned as search results.

Term Descriptions

Figure 4:
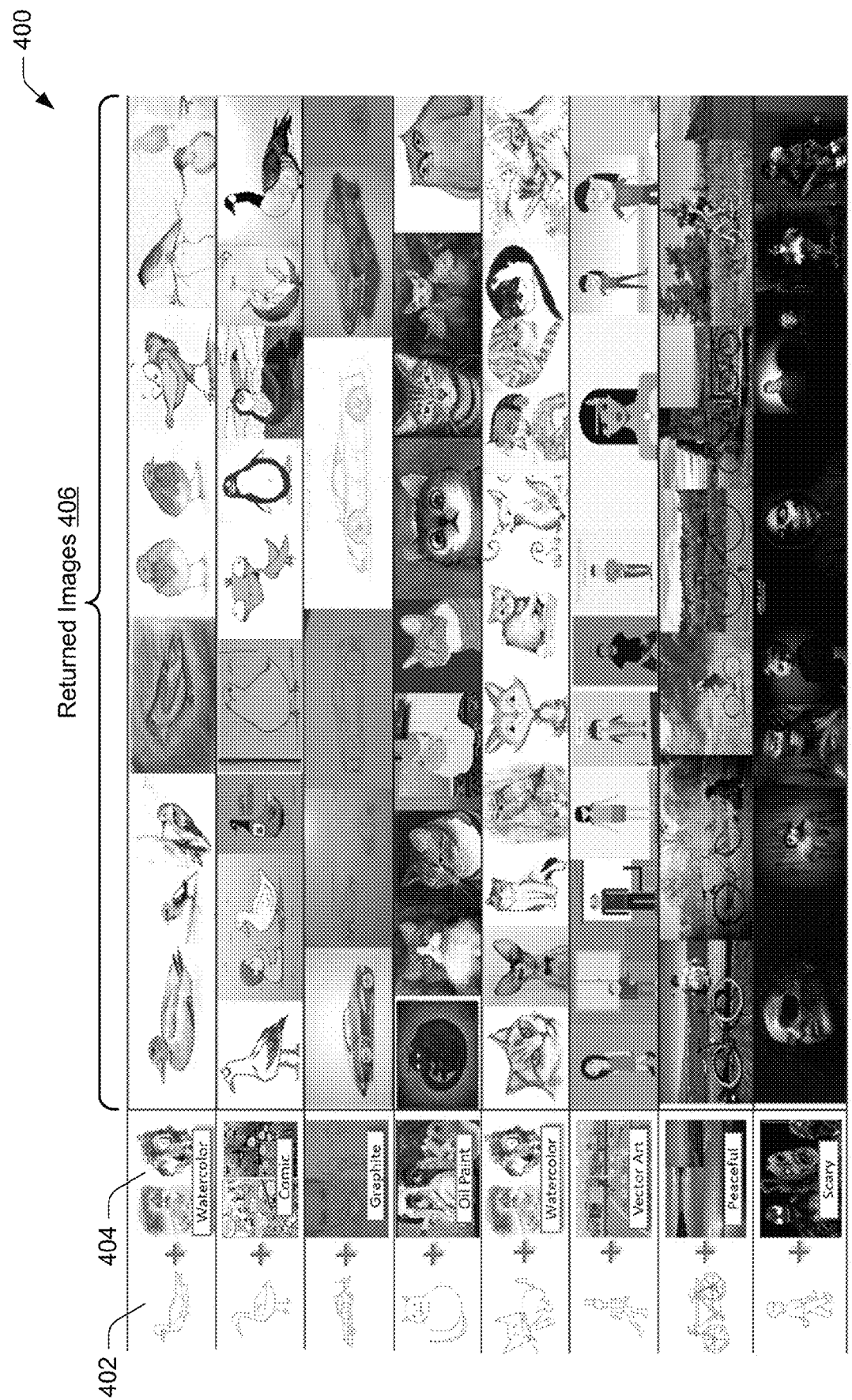
FIG. 4 depicts an example of different sketches, selected images that supplement the sketches by specifying style, and returned images that have structure specified by the sketches and are styled according to the supplemental images.

As used herein, the term "object" refers, generally, to an item depicted in an image. The term "structure" may refer to one or more objects as well as locations and/or orientations of various objects. By way of example, a duck may be considered an example of an object in an image. Structure, however, may correspond to a duck being depicted left of a tree. An "object" may refer to a variety of different items without departing from the spirit or scope of the techniques described herein. FIG. 4 alone, for instance, depicts sketches indicative of different objects including a first bird, a second bird, a car, a first cat, a second cat, a first person, a bike, and a second person. Likewise, "structure" may refer to a variety of different objects as well as locations and orientations of objects without departing from the spirit or scope of the techniques described herein.

As used herein, "style" may refer to a manner in which the content of an image is expressed, and can include different types of artistic media (e.g., watercolor, pen and ink, oil painting, charcoal, graphite, comic, vector graphics, three dimensional (3D) graphics, photography, and so on) and different emotions that are likely to be induced in a viewer (e.g., happy, gloomy, peaceful, scary, and so forth). These are merely examples of different styles. Indeed, style may refer to a variety of different manners in which image content can be expressed without departing from the spirit or scope of the described techniques.

As used herein, the term "visual search" refers to an image search technique in which visual characteristics of exemplary query images are determined, e.g., by computing image feature vectors that describe the visual characteristics of the exemplary images. The exemplary query images may be selected by a user for performing the visual search. In connection with the visual search, images having similar visual characteristics to the exemplary images may be determined. This contrasts with "tag-based searches," which involve matching text-based queries to tags (e.g., strings of text) that are associated with the images to describe the respective image content. Tag-based searches return images having tags that match the text-based queries. Tagging can limit these techniques to a pre-defined taxonomy, however. In relation to tag-based searches are "semantic searches," which involve matching text-based queries to semantically similar tags associated with the images.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ sketch and style based image retrieval as described herein. The illustrated environment 100 includes a service provider system 102, client device 104, and content repository system 106 that are communicatively coupled, one to another, via a network 108.

Computing devices that are usable to implement the service provider system 102, client device 104, and content repository system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 12.

The service provider system 102 is illustrated as including a service manager module 110 that is representative of functionality to provide services accessible via the network 108 that are usable to make products or services available to consumers. The service manager module 110, for instance, may expose content or functionality that is accessible via the network 108 by an application 112 of the client device 104. The application 112 may be configured as a browser, a network-enabled application, and so on, that obtains data from the service provider system 102 via the network 108. This data can be employed by the application 112 to enable a user of the client device 104 to communicate with the service provider system 102, such as to submit an image search query when the service provider system 102 provides functionality perform image searches.

To enable image searches, the application 112 includes image retrieval module 114. In general, the image retrieval module 114 represents functionality to enable images to be requested that have specified styling. The image retrieval module 114 is configured to receive image requests that can be used for visual searches that disentangle structure (e.g., one or more objects in an image's scene) and style (e.g., a manner in which an image, including the one or more objects, is styled). In contrast to tag-based searches, which search for images having associated tags that are semantically related to text-based search terms, visual searches involve searching for image features that are similar to features of one or more query images. As used herein, "style" may refer to a manner in which the content of an image is expressed, and can include different types of artistic media (e.g., watercolor, pen and ink, oil painting, charcoal, graphite, comic, vector graphics, three dimensional (3D) graphics, photography, and so on) and different emotions that are likely to be induced in a viewer (e.g., happy, gloomy, peaceful, scary, and so forth).

In accordance with one or more implementations, the image retrieval module 114 is configured to receive a multi-part input in connection with an image search request. These multi-part inputs include at least a part that specifies the structure (e.g., depicted objects) and a part that specifies style. In particular, the image retrieval module 114 is capable of receiving the structure portion of the input as a user sketch, e.g., a sketch made by a user with a stylus or mouse on a displayed drawing canvas. The image retrieval module 114 may also be configured to receive the structure portion of the input in other ways as described in more detail below. With regard to specifying style for returned images, the image retrieval module 114 allows a user of the client device 104 to select supplemental images having desired styling, e.g., a user may select one or more images having a desired style from a directory of the client device 104 (e.g., prior artwork of the user, prior artwork of other users), from various web pages (e.g., social networking services, digital artwork repositories), from a menu of prepopulated images having a variety of different styles, and so on.

Regardless of the particular structure or style specified, the image retrieval module 114 is configured to generate style-supplemented image request 116 to indicate the specified structure and style. By way of example, if the user specifies a desired object with a sketch, the style-supplemented image request 116 may include data representative of the sketch, e.g., an image file. The image retrieval module 114 is also configured to generate the style-supplemented image request 116 to include data representative of the images selected for conveying the desired style, e.g., image files of the selected images, data identifying the selected images from an image collection, and so forth. The image retrieval module 114 is also configured to initiate communication of the style-supplemented image request 116 to the content repository system 106. As illustrated, the image retrieval module 114 can cause the style-supplemented image request 116 to be communicated over the network 108 to the content repository system 106.

In the illustrated example, the content repository system 106 is depicted receiving the style-supplemented image request 116. To search for images having the style and structure requested by the style-supplemented image request 116, the service provider system 102 may leverage the content repository system 106. Although functionality of the content repository system 106 is illustrated as separate from the service provider system 102, this functionality may also be incorporated as part of the service provider system 102, further divided among other entities, and so forth. The content repository system 106 includes an image retrieval manager module 118 that is implemented at least partially in hardware of a computing device, in part, to perform visual searches of image content 120, which is illustrated in storage 122. In one or more implementations, these visual searches are performed in lieu of semantic (e.g., tag based)

searches—though in some implementations semantic searches may also be leveraged, as described in more detail below. In any case, the image content 120 may represent digital content configured as a variety of different images maintained by the content repository system 106. For example, these images can include digital representations of artistic works users have uploaded to the content repository system 106 for sharing, those indexed by the content repository system 106 in connection with crawling the web, and so forth.

To search the image content 120, the image retrieval manager module 118 is configured to use combined structure and style network 124. In accordance with one or more implementations, the combined structure and style network 124 represents digital content configured as a trained neural network that unifies two discriminatively trained sub-neural networks—a network for recognizing structure (e.g., objects) in images and a network for recognizing style in images. In addition to leveraging the combined structure and style network 124 to perform visual searches of the image content 120, the image retrieval manager module 118 also represents functionality to generate the combined structure and style network 124. The image retrieval manager module 118 may generate the combined structure and style network 124 by generating or receiving a structure network, generating or receiving a style network, and combining the two networks as described in more detail below.

The image retrieval manager module 118 may generate the structure network using deep learning techniques in relation to digital content configured as images that correspond to sketches, digital content configured as positive image examples (e.g., where the content of the images matches sketched objects), and digital content configured as negative image examples (e.g., where the content of the images does not match the sketched objects). The image retrieval manager module 118 may generate the style network using deep learning techniques in relation to digital content configured as images that correspond to different styles, digital content configured as positive image examples of the styles (e.g., where the images match the style), and digital content configured as negative image examples (e.g., where the images do not match styles).

In any case, by utilizing the combined structure and style network 124, the image retrieval manager module 118 searches the image content 120 for images having visual characteristics that are similar to the structure and similar to the style specified by the style-supplemented image request 116. Using the combined structure and style network 124, the image retrieval manager module 118 may determine scores for images that indicate a suitability of visual characteristics of the images with respect to the structure and style specified by the style-supplemented image request 116. Based on this, the image retrieval manager module 118 identifies styled images 126 to return to the client device 104. By way of example, the image retrieval manager module 118 may return a predetermined number (e.g., user specified) of the styled images 126 to the client device 104. The styled images 126 may be full-fidelity versions of the images, thumbnails that are selectable to retrieve the full-fidelity versions of the images, and so forth.

Broadly speaking, the styled images 126 are identified from the image content 120 as the those that include the structure specified in the style-supplemented image request 116 (e.g., the sketched object) and that are styled in a manner similar to the selected supplemental images. Sketch and style based image retrieval enables users to request and obtain images having desired objects in desired styles. This can be advantageous when a user does not know of or have an image available that includes a suitable example of a desired object styled in a desired style. By disentangling the notions of structure and style as described above and below, image searches may return images with a desired object also having a "look and feel" desired.

Having considered an example environment, consider now a discussion of some example details of the techniques for sketch and style based image retrieval in a digital medium environment in accordance with one or more implementations.

Sketch and Style Based Image Retrieval

Figure 2:
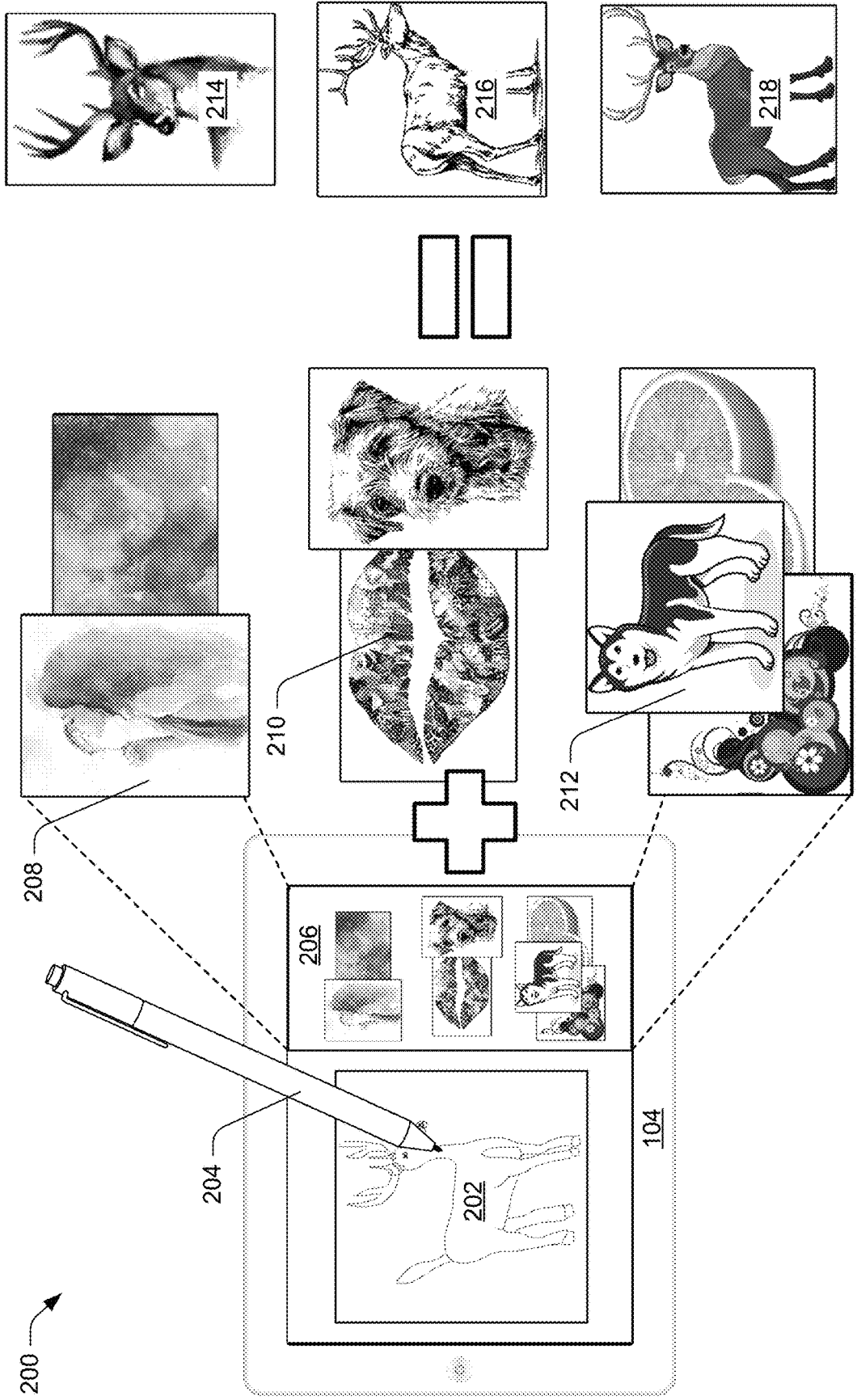
FIG. 2 depicts an example sketch-based image request, differently styled images to supplement the request, and returned images that have structure specified by the sketch and are styled according to the supplemental images.

FIG. 2 depicts an example 200 of a sketch-based image request, differently styled images to supplement the request, and returned images that have structure specified by the sketch and are styled according to selected supplemental style images.

The illustrated example 200 includes the client device 104 of FIG. 1. The client device 104 is depicted displaying user sketch 202, which a user of the client device 104 may sketch with stylus 204. It should be appreciated that a user of the client device 104 may provide input to draw the user sketch 202 in ways other than with a stylus without departing from the spirit or scope of the techniques described herein. By way of example, a user of the client device 104 may provide input for the user sketch 202 using a mouse, using a finger to provide touch input, and so on.

In any case, the user sketch 202 is configured to represent a structure portion of the style-supplemented image request 116. In other words, a user may specify the object or objects desired in returned images by way of the user sketch 202. The image retrieval module 114 is configured to generate the style-supplemented image request 116 to indicate the structure specified by the user sketch 202. Consider the illustrated example 200 in accordance with one or more embodiments. In this example, a user of the client device 104 has sketched a deer in the user sketch 202. This can indicate that the user would like to obtain images having a deer. Clearly, a user may sketch a variety of different objects or structures (e.g., buildings, landscapes, etc.) that serve as a basis for the structure searched for in the image content 120.

In addition to the user sketch 202, the client device 104 is depicted displaying selectable supplemental images 206, which are selectable to indicate a manner in which the object or objects indicated by the user sketch 202 are to be styled in returned images. In the illustrated example 200, the selectable supplemental images 206 include images generally having a first style 208, images generally having a second style 210, and images generally having a third style 212. In this example, the images generally having the first style 208 are watercolor images, the images generally having the second style 210 are pen and ink drawings, and the images generally having the third style 212 are vector graphics images. It should be appreciated that the selectable supplemental images 206 may have a variety of different styles without departing from the spirit or scope of the techniques described herein. For instance, the selectable supplemental images 206 may alternately or additionally include oil paintings, comics, 3D graphics, graphite drawings, photographs, and so on. As noted above, the selectable supplemental images 206 may also originate from a variety of different sources (e.g., previous artwork of a user of the client device 104, previous artwork obtained from other users, social networking services, digital artwork repositories, and so on) without departing from the spirit or scope of the described techniques.

Moreover, a user interface displayed in connection with providing input for a style-supplemented image request 116 may not initially display the selectable supplemental images 206, as illustrated. Rather, the user interface may enable a user of the client device 104 to select a menu option, which when selected displays a dialog box that allows the user to browse to directories associated with the client device 104—from which the user can select supplemental images. Alternately or in addition, the client device 104 may support functionality to leverage a browser application that allows the user to browse to web pages to select supplemental images from web pages.

Regardless of how the user selects supplemental images, the selected images supplement the object specified via the user sketch 202. In scenarios where an object is specified in other ways (e.g., via a text query, a digital photograph, or other digital artwork), the selected images are configured to supplement the object specified in those other ways. Returning to the scenario in which the object is specified via the user sketch 202, though, selected images supplement the user sketch 202 insofar as they specify style for the structure of the user sketch 202.

Consider again the illustrated example 200, in which the user sketch 202 indicates a deer. In one scenario, the user submits an image search request based on the user sketch 202 of the deer. In connection with this request, the user also selects the images generally having the first style 208. As mentioned above, the first style in the illustrated example 200 may correspond to watercolor. Given this, the image retrieval manager module 118 utilizes the combined structure and style network 124 to search for watercolor images of deer—an example of which is watercolor deer image 214. The image retrieval manager module 118 may thus return the watercolor deer image 214 as one of the styled images 126.

The illustrated example 200 also includes pen and ink deer image 216 and vector graphics deer image 218. The styled images 126 may include the pen and ink deer image 216 in scenarios where an image search request is submitted based on the user sketch 202 of the deer and a selection of the images generally having the second style 210, e.g., the pen and ink supplemental images. The styled images 126 may include the vector graphics deer image 218 in scenarios where an image search request is submitted based on the user sketch 202 of the deer and a selection of the images generally having the third style 212, e.g., the vector graphics supplemental images.

It should be appreciated that the application 112 may display user interfaces configured in a variety of different ways to enable sketch and style based image retrieval. These user interfaces may enable users to provide sketch-based image requests in a variety of different ways without departing from the spirit or scope of the techniques described herein. The user interfaces may also enable users to select differently styled images to supplement those sketches in a variety of different ways without departing from the spirit or scope of the techniques described herein. Regardless of the user interface components that enable a user to specify the structure and style of a visual search for images or the particular structure or style specified, the image retrieval module 114 generates the style-supplemented image request 116 based on the specified structure and style. In this context, consider FIG. 3.

Figure 3:
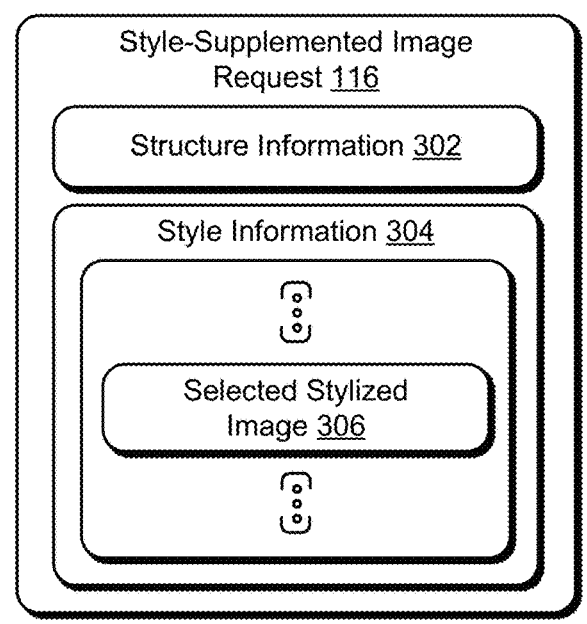
FIG. 3 depicts an example implementation of a style-supplemented image search request.

FIG. 3 illustrates an example 300 of a style-supplemented image search request. The illustrated example 300 includes from FIG. 1 an example of the style-supplemented image request 116.

In this example, the style-supplemented image request 116 includes structure information 302 and style information 304, which is depicted having selected stylized image 306. The style information 304 is depicted with ellipses to indicate that the style-supplemented image request 116 may include multiple selected stylized images 306. Indeed, a user may select any number of supplemental images for specifying the style desired in returned images.

Figure 5:
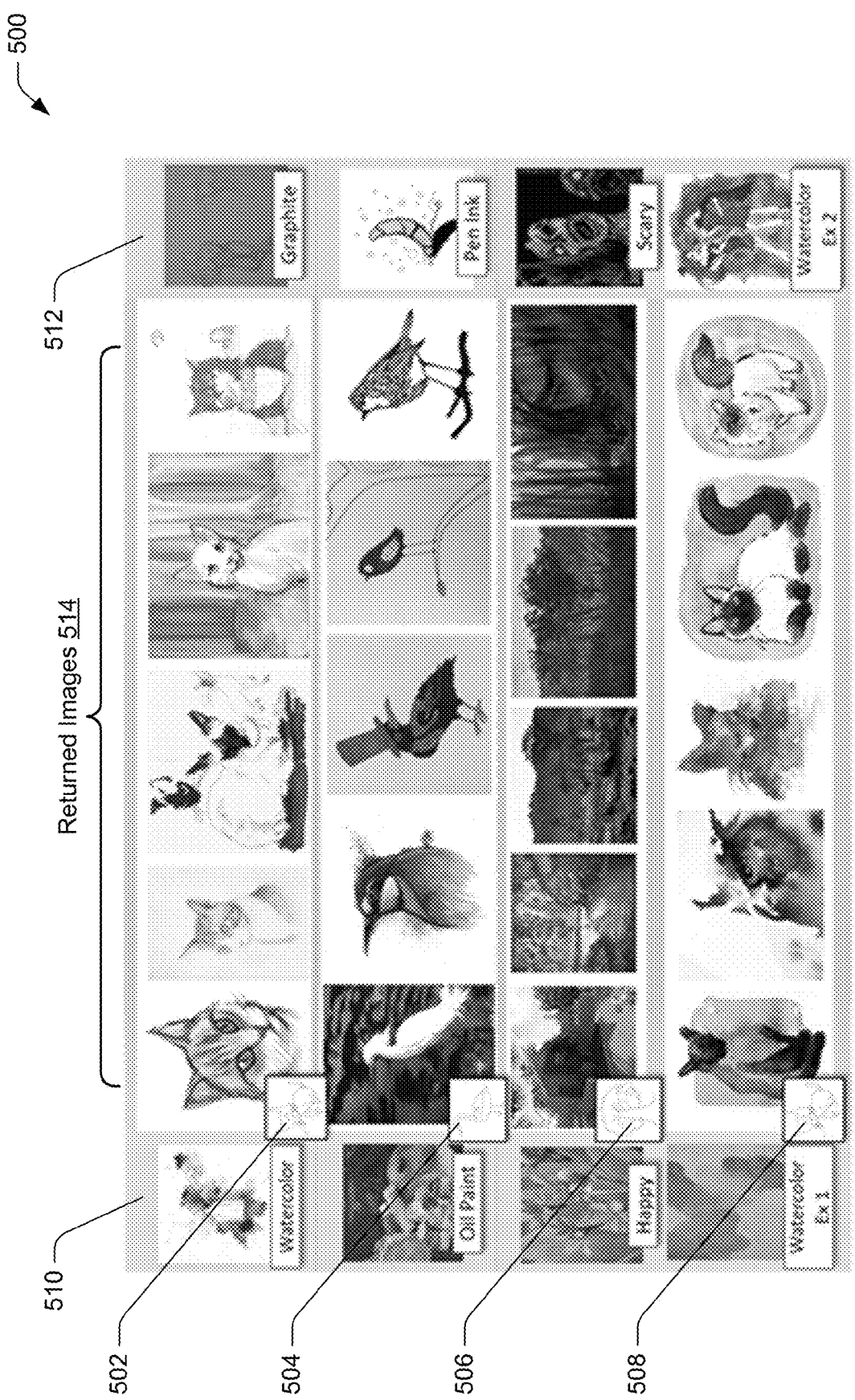
FIG. 5 depicts an example of different sketches, selected supplemental images for each sketch having different styles, and returned images for each sketch styled in the different styles as well as returned images in which the different styles are blended.

In accordance with the described techniques, the structure information 302 represents data suitable to enable a visual search for objects or structure specified in connection with the style-supplemented image request 116. In one or more implementations, the structure information 302 corresponds to a user sketch, such as the user sketch 202. Other examples of user sketches are depicted in FIGS. 4 and 5. Given a user sketch, the image retrieval manager module 118 is configured to perform a visual search of the image content 120. In particular, the image retrieval manager module 118 searches for images having structure indicated by the user sketch. In general, visual searches (in contrast to tag-based searches) are capable of recognizing visual characteristics of rich visual concepts that are difficult to express using text or that deviate from predefined tag ontologies.

Although the techniques described herein are discussed in relation largely to implementations where the structure information 302 comprises user sketches, the structure information 302 may comprise other digital content capable of specifying image structure without departing from the spirit or scope of the techniques describe herein. By way of example, the structure information 302 may correspond to digital content configured as a photographic image. In such scenarios, objects or structure captured in the image may serve as a basis for the structure portion of the image search. Consider, for instance, an example in which the structure information 302 represents a digital photograph of a duck. In this example, further assume that the style information includes multiple selected stylized images 306 corresponding to watercolor paintings. In this particular example, the image retrieval manager module 118 can perform a visual search of the image content 120 for watercolor images of ducks.

In one or more implementations, the structure information 302 may be text-based, e.g., a text string corresponding to text entered into a text field of a user interface. The structure information 302 may be configured as text, in part, because the combined structure and style network 124 enables independent specification of structure and style in a query. Indeed, the combined structure and style network 124 is configured as a unification of independently learned style and structure networks. Given this, the combined structure and style network 124 can thus be generated in a way that incorporates a structure network trained using text tags. It should be appreciated that the structure information 302 may be configured as different data capable of indicating a desired object to be included in returned images (in addition to or instead of user sketches, selected photographic images, or text search queries) without departing from the spirit or scope of the techniques described herein.

In addition to the structure information 302, the style information 304 also represents data that is specified for performing a visual search for images. In contrast to the structure information 302, however, the style information 304 specifies a desired "look and feel" for the returned images. For example, the structure information 302 is capable of specifying to return images that appear to have been created using different types of artistic media (e.g., watercolor, pen and ink, oil paint, charcoal, graphite, comic, vector graphics, three dimensional (3D) graphics, photography, and so on), return images corresponding to different emotions likely to be induced in a viewer (e.g., happy, gloomy, peaceful, scary, and so on), and so forth. As noted above and below, the style information 304 is specified by the selected stylized images 306.

In general, the selected stylized images 306 are selected by a user to supplement the structure information 302, e.g., to convey a style in which the object indicated by the structure information 302 is to be styled. The selected stylized images 306 serve as a basis for performing a visual search of the image content 120 to find images having desired styles. As noted above, visual searches are a way of detecting visual similarity that can be difficult to describe using text or detecting characteristics that differ from text tags. To this extent, if the selected stylized images 306 are watercolor paintings, the image retrieval manager module 118 is configured to perform a visual search for watercolor images of the structure indicated by the structure information 302. A user may select one or more images to supplement the structure information 302. The selected stylized images 306 are configured, in part, to direct the image search to images styled similarly to the selected stylized images 306. Another advantage of separate specification of structure and style is that the selected stylized images 306 are not required to have the desired object or structure, e.g., the object or structure specified by the structure information 302. Rather, the selected stylized images 306 may include a variety of different object or structures. The independent specification nevertheless enables images having the specified structure to be returned. In this context, consider FIG. 4.

FIG. 4 depicts an example 400 of different sketches that form a portion of image search requests, selected images that supplement the sketches by specifying style, and returned images that have structure specified by the sketches and are styled according to the supplemental images.

In particular, the illustrated example 400 includes sketches 402, selected supplemental images 404, and returned images 406. Each of the sketches 402 is depicted next to two of the supplemental images 404. Here, each of the sketches 402 may correspond to the structure information 302 and the two supplemental images 404 may correspond to the selected stylized images 306 of a respective style-supplemented image request 116. Each sketch 402 and corresponding supplemental images 404 are also depicted in line with multiple returned images 406. These returned images 406 correspond to the styled images 126 identified by the image retrieval manager module 118 from the image content 120 and returned, e.g., based on a style-supplemented image request 116 having structure information 302 and style information 304 representing the respective sketch 402 and supplemental images 404.

As noted in the illustrated example 400, the selected supplemental images 404 for the first sketch 402 are watercolor images. Accordingly, the respective returned images 406 are generally watercolor images having an object similar to the object of the first sketch 402. Further, the selected supplemental images 404 for the second sketch 402 are comic images, the selected supplemental images 404 for the third sketch 402 are graphite images, the selected supplemental images 404 for the fourth sketch 402 are oil paint images, the selected supplemental images 404 for the fifth sketch 402 are also watercolor images, the selected supplemental images 404 for the sixth sketch 402 are vector art images, the selected supplemental images 404 for the seventh sketch 402 are peaceful images, and the selected supplemental images 404 for the eighth sketch 402 are scary images. Accordingly, the respective returned images 406 for the second sketch 402 are generally comic images of objects similar to the second sketched object, the respective returned images 406 for the third sketch 402 are generally graphite images of objects similar to the third sketched object, the respective returned images 406 for the fourth sketch 402 are generally oil paint images of objects similar to the fourth sketched object, the respective returned images 406 for the fifth sketch 402 are generally watercolor images of objects similar to the fifth sketched object, the respective returned images 406 for the sixth sketch 402 are generally vector art images of objects similar to the sixth sketched object, the respective returned images 406 for the seventh sketch 402 are generally peaceful images of objects similar to the seventh sketched object, and the respective returned images 406 for the eighth sketch 402 are generally scary images of objects similar to the eighth sketched object.

Since the combined structure and style network 124 is configured to recognize rich visual concepts, the image retrieval manager module 118 is capable of performing inter- and intra-style image searches. By "inter-style" image searches, it is meant that the selected supplemental images have different styles, e.g., one of the images selected for a search is a watercolor image and another image selected for the same search is a pen and ink image. In connection with inter-style searches, the image retrieval manager module 118 can return images that are styled according to each of the different styles separately (e.g., a watercolor image and a pen and ink image) and also return images that blend the styles (e.g., an image having both watercolor and pen and ink). By "intra-style" image searches, it is meant that the selected supplemental images have at least one similar style characteristic (e.g., the selected supplemental images appear to have been created using a same medium such as watercolor) but also exhibit at least one different style characteristic (e.g., the selected supplemental images appear to have been created using different watercolor painting techniques). In this context, consider FIG. 5. FIG. 5 depicts an example 500 of different sketches, selected supplemental images for each sketch having different styles, and returned images for each sketch that are styled in the different styles as well as returned images in which the different styles are blended.

In particular, the illustrated example 500 includes sketches 502, 504, 506, 508. The illustrated example 500 also includes first selected supplemental images 510 for the sketches, second selected supplemental images 512 for the sketches, and returned images 514. Each of the sketches in the illustrated example 500 corresponds to one of the first selected supplemental images 510 and one of the second selected supplemental images 512. For example, the sketch 502 corresponds to the first selected supplemental image 510 located in the upper left position of the example (labeled "Watercolor") and the second selected supplemental image 512 located in the upper right position of the example (labeled "Graphite"). Each sketch 502, 504, 506, 508, and the corresponding first and second selected supplemental images 510, 512, may correspond to the structure information 302 and the selected stylized images 306, respectively, of a style-supplemented image request 116. Each of the sketches 502, 504, 506, 508, is also depicted with multiple returned images 514. These returned images 514 correspond to the styled images 126 identified by the image retrieval manager module 118 from the image content 120 and returned, e.g., based on a style-supplemented image request 116 having structure information 302 and style information 304 representing the respective sketch 502, 504, 506, 508 and corresponding first and second selected supplemental images 510, 512.

As noted in the illustrated example 500, the first selected supplemental image 510 for the sketch 502 is a watercolor image and the second selected supplemental image 512 for the sketch is a graphite image. The respective returned images 514 include at least one watercolor image having an object similar to the object of the sketch 502, at least one graphite image having an object similar to the object of the sketch 502, and at least one image having a blend of watercolor and graphite with an object similar to the object of the sketch 502. The returned images 514 for the other sketches 504, 506, 508 include similar types of images, e.g., images having a style that is similar to the first selected supplemental image 510, images having a style that is similar to the second selected supplemental image 512, and images that blend the styles of the first and second selected supplemental images 510, 512.

The sketch 508, corresponding first and second selected supplemental images 510, 512, and corresponding returned images 514, represent a scenario involving an intra-style image search. This is because the first and second selected supplemental images 510, 512 are both examples of watercolor images. However, these particular watercolor images have different visual characteristics. Accordingly, the respective returned images 514 are watercolor images having an object similar to the object of the sketch 508. However, these returned images 514 also include images having visual characteristics similar to the first selected watercolor example, images having visual characteristics similar to the second watercolor example, and images that blend the characteristics of the first and second watercolor examples. The image retrieval manager module 118 is configured to recognize such nuances in style and return images with objects similar to a user sketch by leveraging the combined structure and style network 124. The image retrieval manager module 118 is not only configured to leverage the combined structure and style network 124, but also represents functionality to generate the combined structure and style network 124. In this context, consider FIG. 6.

Figure 6:
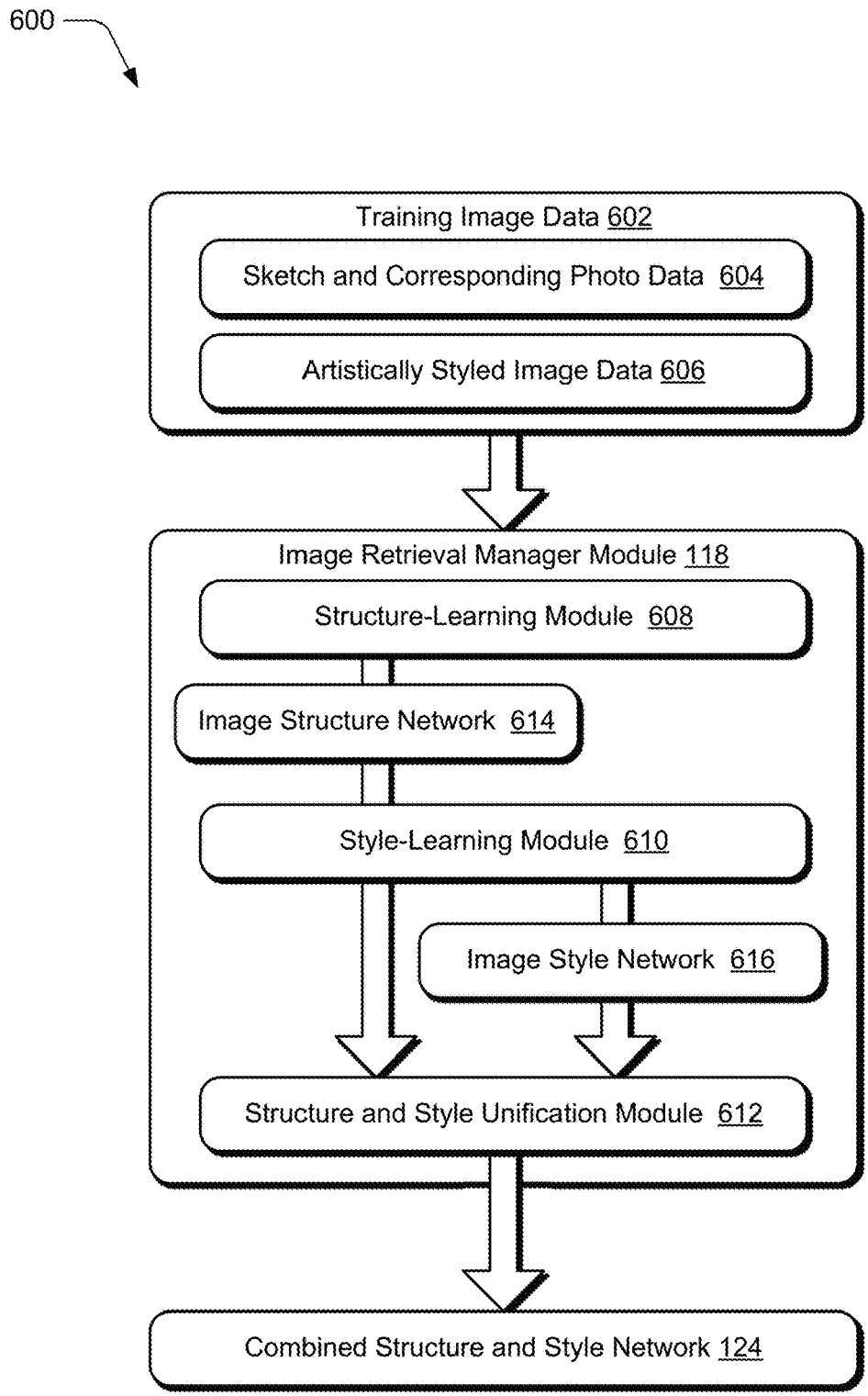
FIG. 6 depicts an example implementation in which a content repository system of FIG. 1 generates a combined structure and style network capable of searching for images that have specified structure and are styled according to selected supplemental images.

FIG. 6 depicts a system 600 in an example implementation in which the content repository system 106 of FIG. 1 generates a combined structure and style network capable of searching for images that have specified structure and are styled according to selected supplemental images. The illustrated system 600 is depicted with the image retrieval manager module 118 of the content repository system 106 of FIG. 1. In this example, the image retrieval manager module 118 is depicted obtaining training image data 602, which includes sketch and corresponding photo data 604 and artistically styled image data 606.

The sketch and corresponding photo data 604 represent digital content configured as images, which may include images of sketched objects as well as photographic images configured to serve as positive and negative examples of the sketched objects. By way of example, the sketch and corresponding photo data 604 may include an image that is a sketch of a bike, multiple photographic images of bikes, and multiple photographic images that do not include bikes. Additionally, the sketch and corresponding photo data 604 may include relational data (e.g., tags or other metadata) that indicates that the multiple photographic images of the bikes are positive examples of the sketched image of bike and that the multiple photographic images that do not include the bike are negative examples of the sketched image of the bike.

The artistically styled image data 606 represents additional digital content configured as images, which may include multiple images having a variety of different styles. For instance, these images may include images appearing to have been created using one or more different types of artistic media (e.g., watercolor, pen and ink, oil painting, charcoal, graphite, comic, vector graphics, three dimensional (3D) graphics, photography, and so on), images corresponding to different emotions likely to be induced in a viewer (e.g., happy, gloomy, peaceful, scary, and so on), and so forth. The artistically styled image data 606 may also be associated with relational data. This relational data can indicate for a given styled image other styled images that are positive examples of the given image's style as well as other styled images that are negative examples of the given image's style. Consider an example in which the given image is a watercolor image. In accordance with this example, positive examples of the given image may correspond to other watercolor images while negative examples of the given image may correspond to vector graphics images.

In any case, the image retrieval manager module 118 represents functionality to generate the combined structure and style network 124 from the training image data 602. The image retrieval manager module 118 is depicted having structure-learning module 608, style-learning module 610, and structure and style unification module 612. These modules represent different aspects of functionality that can be leveraged to generate the combined structure and style network 124. Although each of these modules is illustrated as part of the image retrieval manager module 118, it is to be understood that the functionality represented by these modules may be carried out on remotely located computing devices. To this extent, data generated in accordance with the represented functionality (e.g., different learned networks) may simply be received or otherwise accessed by the image retrieval manager module 118—rather than generated by it.

The structure-learning module 608 represents functionality to generate image structure network 614 from the sketch and corresponding photo data 604. In general, the structure-learning module 608 represents functionality to learn to recognize an object in images given a sketch or photograph of the object. Based on this learning, the structure-learning module 608 generates the image structure network 614. Broadly speaking, the image structure network 614 is configured to be leveraged to perform object recognition in images based on an input sketch or photograph.

In one or more implementations, the structure-learning module 608 is configured to use deep learning to generate the image structure network 614 as a convolutional neural network according to known techniques. Specifically, these known techniques are configured to generate the image structure network 614 as a triplet convolutional neural network. The structure-learning module 608 may thus be configured to use a triplet model to perform cross-category retrieval. In accordance with such configurations, the image structure network 614 may incorporate an anchor branch configured to handle a sketch query as input. The image structure network 614 may also incorporate positive and negative branches configured to handle photographic images as input. The image structure network 614 may thus be generated as a joint embedding learned from exemplar triplets comprising query sketches, positive photographic images that match those sketches, and negative photographic images that do not. An output layer of the image structure network 614 may be configured as a dimensional feature vector (e.g., a 128-dimensional (128-D) feature vector) and capable of inhibiting sharing of network weights across branches. In other words, the structure-learning module 608 may generate the image structure network 614, in part, via training that yields separate functions for embedding a sketch $g_s(.)$ and for the image $g_i(.)$ content. These functions are configured to be embedded into the combined structure and style network 124, as described below in relation to its generation.

Further, the structure-learning module 608 may train the image structure network 614 using a training process in which a dataset having a large number of sketched images is used for the anchor branch and in which the dataset is augmented with social network service-sourced photographic images for the positive and negative branches, e.g., the sketch and corresponding photo data 604. Additionally, this training may include the structure-learning module 608 tuning the image structure network 614 using triplets sampled from representative imagery, e.g., random artwork images selected from the artistically styled image data 606 with sketches from the sketch and corresponding photo data 604 having category overlap. As noted above, the combined structure and style network 124 may be utilized to recognize structure from text queries. In such implementations, the structure-learning module 608 may generate the image structure network 614 using different techniques than just discussed. By way of example, the structure-learning module 608 may utilize one or more machine learning techniques to generate the image structure network 614 as a combined semantic and visual characteristic embedding.

Turning now to the discussion of the style-learning module 610, in accordance with one or more implementations. The style-learning module 610 represents functionality to generate the image style network 616 from the artistically styled image data 606. In general, the style-learning module 610 represents functionality to learn to recognize visual characteristics indicative of a style in images given supplemental images having the style. Based on this learning, the style-learning module 610 generates the image style network 616. Broadly speaking, the image style network 616 is configured to be leveraged to perform style recognition in images based on the styles of one or more input images.

In or more implementations, the style-learning module 610 is configured to use deep learning to generate the image style network 616 as a convolutional neural network—specifically as a triplet convolutional neural network. In accordance with such configurations, the style-learning module 610 may configure the image style network 616 with three fully shared (e.g., Siamese) branches having an appended inner-product layer to serve as a bottleneck. The style-learning module 610 may configure this inner-product layer for each of the branches as a dimensional feature vector, such as a 128-D feature vector. The style-learning module 610 may train the image style network 616 using the artistically styed image data 606. This may include the style-learning module 610 partitioning the artistically styed image data 606 into a predetermined number of style categories (S) balanced across a predetermined number of semantic categories (7). In one or more implementations, the style-learning module 610 may partition the artistically styed image data 606 evenly into the predetermined number of style categories.

The style-learning module 610 may also be configured to initially train the image style network 616 via classification loss, e.g., soft-max loss with 30 epochs. After classification, the style-learning module 610 may be configured to refine the training under triplet loss, e.g., with 30 epochs. The style-learning module 610 may form the triplets for training the image style network 616 by randomly selecting an anchor image (e.g., from the artistically styled image data 606), where the anchor image can be represented as $\alpha=(s \in S, z \in Z)$. This indicates that each randomly-selected anchor image $\alpha$ is associated with a style category s of the predetermined number of style categories S and with a semantic category z of the predetermined number of semantic categories Z. To form these triplets, the style-learning module 610 also randomly selects a hard positive image and a hard negative image, where the hard positive image can be represented as $p=(s, z' \in Z \backslash z)$ and the hard negative image can be represented as $n=(s' \in S \backslash s, z)$. This indicates that the hard positive image p is associated with a same style category s as the anchor image $\alpha$ but is associated with a different semantic category than the anchor image, z' (a semantic category that is not the semantic category z of the anchor image). This also indicates that the hard negative image n is associated with a same semantic category z as the anchor image $\alpha$ but is associated with a different style category than the anchor image, s' (a style category that is not the style category s of the anchor image). Given such triplets, the style-learning module 610 may generate the image style network 616 according to a function $f(.)$. In one or more implementations, the image style network 616 may be configured to implement $f(.)$ by minimizing the following:

$$\mathcal{L}_{(\alpha,p,n)}=[m+|f(\alpha)-f(p)|^2-|f(\alpha)-f(n)|^2]_+$$

Here, the term m represents a margin configured to promote convergence—an example value of which is 0.2. Further, $[x]_+$ represents a non-negative part of x, where x is $m+|f(\alpha)-f(p)|^2-|f(\alpha)-f(n)|^2$. The term $\mathcal{L}(\alpha,p,n)$ represents a learned portion of the embedding of the image style network 616, specifically the portion of the embedding learned based on a given triplet that includes the anchor image $\alpha$, the hard positive image p, and the hard negative image n. The above-discussed refined training under triplet loss, carried out by the style-learning module 610, is effective to improve a decorrelation capability of the image style network 616 to discourage learned correlations with objects, such as correlations between trees (object) and peaceful (style) and correlations between skulls (object) and scary scenes (styles). In this way, the image structure network 614 and the image style network 616 are discriminatively trained to recognize, respectively, style and structure in images. These networks may then be unified to enable recognition in images of independently specified style and structure. In this context, consider the following discussion of the structure and style unification module 612.

The structure and style unification module 612 represents functionality to combine the discriminatively trained image structure network 614 and the image style network 616 to generate the combined structure and style network 124. As discussed above and below, the combined structure and style network 124 is digital content configured as an embedding space that can be leveraged to recognize specified structure (e.g., objects) in images that are styled according to specified styling.

As discussed above, an output layer of the image structure network 614 and an inner-product layer of the image style network 616 may be configured as dimensional feature vectors (e.g., 128-D feature vectors) in accordance with one or more implementations. In such implementations, the structure and style unification module 612 may be configured to normalize and concatenate these output feature vectors to form a dimensional input feature vector, e.g., concatenate two 128-D output feature vectors to form a 256-dimensional (256-D) input feature vector. In such implementations, the combined structure and style network 124 may also be configured as a triplet network—as are the image structure network 614 and the image style network 616. As a result of forming the dimensional input feature vector, the structure and style unification module 612 forms the structure of each triplet branch for the combined structure and style network 124. The anchor branch of the combined structure and style network 124 configured in this way incorporates the function for embedding a sketch $g_s(.)$ and the positive and negative branches incorporate the function for embedding the image $g_i(.)$ content.

Further, the structure and style unification module 612 is also capable of configuring triplet branches of the combined structure and style network 124 to feed forward to final inner product layers. In one or more implementations, these final inner product layers may be configured as different dimensional feature vectors (e.g., a 256-D and a 64-D feature vector) that are separated by rectified linear unit activation and are configured to learn a projection $h(.)$. In particular, these final inner product layers are configured to learn the projection $h(.)$ over the output feature vectors of the image structure network 614 and the image style network 616 for visual search.

In connection with generating the combined structure and style network 124 from the image structure network 614 and the image style network 616, the structure and style unification module 612 is further configured to use a unifying training technique. In one or more implementations, the unifying training technique involves the structure and style unification module 612 initially training the combined structure and style network 124 with an additional classification network that recognizes each combination of the style categories (S) and the semantic categories (Z) in the dataset. In connection with this training, the structure and style unification module 612 may also minimize a hybrid loss associated with the combined structure and style network 124. In one or more implementations, the structure and style unification module 612 minimizes a hybrid loss that is expressed according to the following:

$$\mathcal{L}'(a, p, n) = \sum_{i \in \{a,p,n\}} \phi_s S(i) + \phi_t \mathcal{L}(a, p, n)$$

Here, the terms $\phi_s$ and $\phi_t$ represent weights indicative of a relative importance of style and structure, respectively, during training. These weights may be manually set to encourage accurate training. In one or more implementations, the structure and style unification module 612 may be configured to then provide a sketch query and a homogenous style set of artwork (e.g., solely watercolor images) to the separate structure $g(.)$ and style $f(.)$ arms of the combined structure and style network 124's anchor branch. This is effective to produce a query feature vector, e.g., a 256-D query feature vector. Broadly speaking, the output of the style stream is averaged over each of images of the homogeneous style set. Further, the positive and negative vectors are generated by leveraging the structure $g(.)$ and style $f(.)$ arms each using a single artwork image selected randomly.

With further regard to the unifying training process, the structure and style unification module 612 may be configured to initially form additional triplets of images for training. In one or more implementations, these triplets comprise anchor image data (e.g., a first image of a sketched object and at least a second image that specifies style), positive image data (e.g., an image having an object similar to the sketched object and that is styled in a similar manner as the second image), and negative image data (e.g., an image that is styled in a similar manner as the second image but does not include an object similar to the sketched object, an image that is different in style from the second image but includes an object similar to the first image, or an image that has both a different object than the first image and a different style than the second image) randomly.

Alternately or in addition, the structure and style unification module 612 may form some of the triplets to include an anchor image to specify both an object and a style, positive image data (e.g., an image having an object similar to the specified object and styling similar to the anchor image), and negative image data (e.g., an image that is styled in a similar manner as the anchor image but does not include an object similar to the specified object, an image that is different in style from the anchor image but includes an object similar to the anchor image, or an image that has both a different object and a different style than the anchor image) randomly. By exposing the triplets to the combined structure and style network 124, it learns an optimal combination of the structure and style streams from the image structure network 614 and the image style network 616. As the training progresses, the structure and style unification module 612 may be configured to narrow the negative data used to train the combined structure and style network 124, such as by selecting negative training samples from a top number of returned images using a current network weight as a visual search system. In connection with the training, the structure and style unification module 612 may subject the query sketches used for the anchor branch to random affine perturbation, e.g., one or more of rotation, scale, transformation, and so forth.

Figure 7:
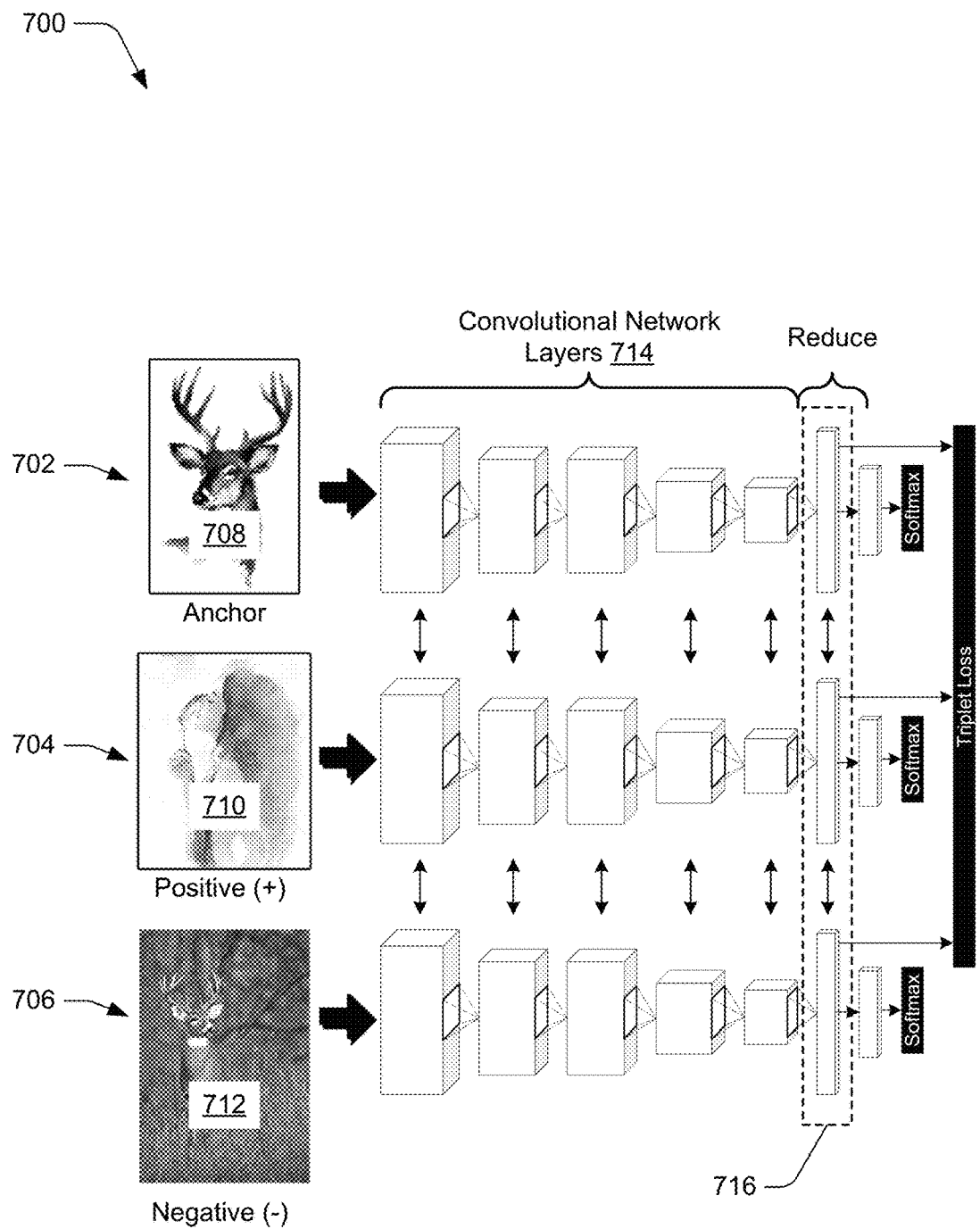
FIG. 7 depicts an example implementation in which a style network is learned by deep learning.
Figure 8:
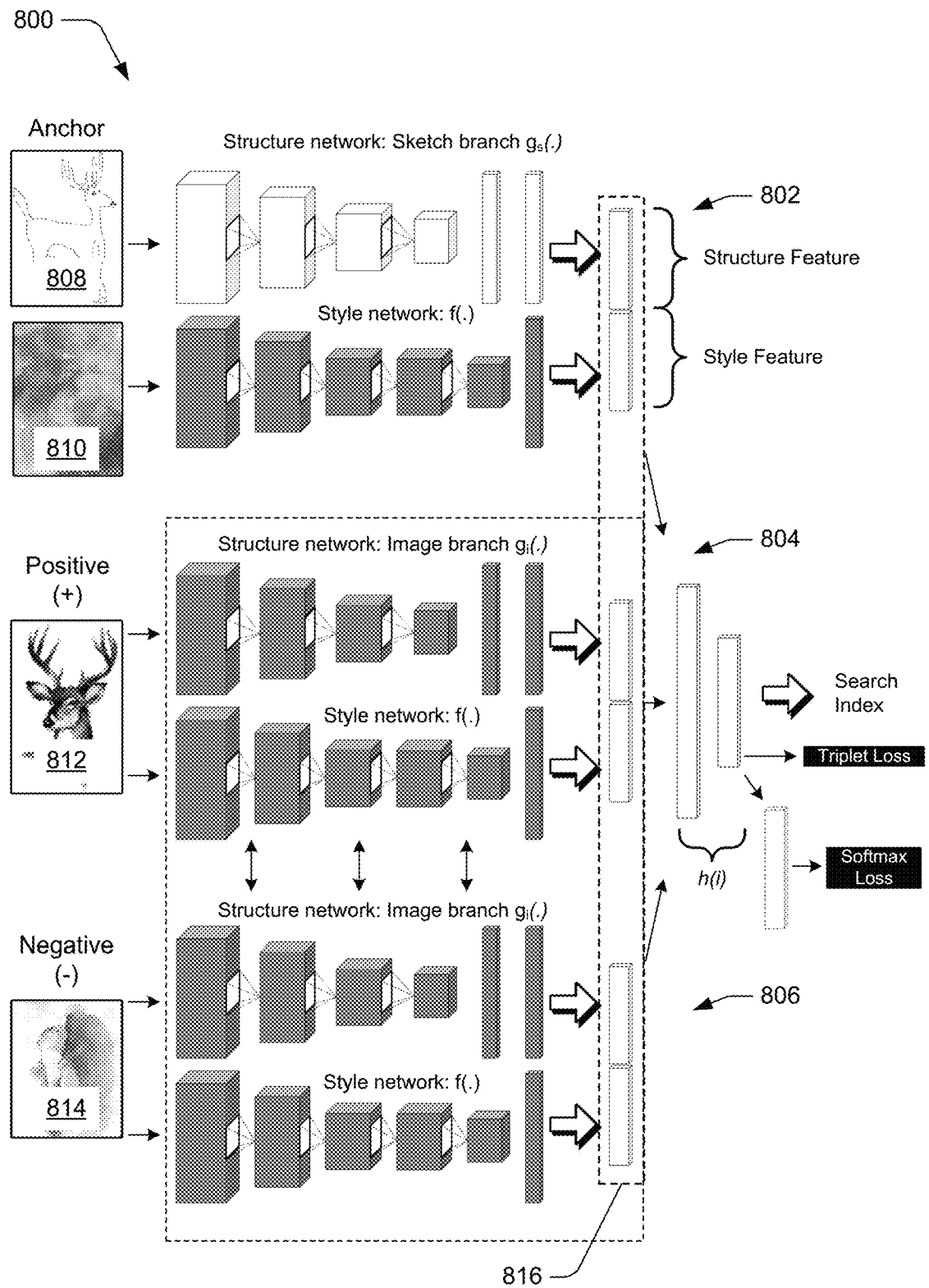
FIG. 8 depicts an example implementation in which a combined structure and style network is generated by combining a structure network and style network that are independently learned by deep learning.

In the context of generating the combined structure and style network 124 by generating or receiving the image structure network 614 and the image style network 616 and then unifying them, consider FIGS. 7 and 8. FIG. 7 depicts an example 700 of an implementation in which a style network is learned by deep learning—the deep learning involving a triplet convolutional neural network. With reference back to FIG. 6, the illustrated example 700 may correspond to the image style network 616.

In the illustrated example 700, anchor branch 702, positive exemplar branch 704, and negative exemplar branch 706 are depicted. These represent branches of the image style network 616 when it is configured as a triplet convolutional neural network. The illustrated example 700 also includes images 708, 710, 712, which represent example images that the style-learning module 610 may provide, respectively, to the anchor branch 702, positive exemplar branch 704, and negative exemplar branch 706 as part of training the image style network 616. Further, the illustrated example 700 includes multiple convolutional network layers 714 and an inner-product layer 716. In one or more implementations, the convolutional network layers 714 may be configured as a pool 5 layer (as depicted) for learning to recognize similar styles and to discriminate between different styles in images. As discussed above, the inner-product layer 716 may be configured as a 128-D feature vector that serves as a bottleneck after the convolutional network layers 714 and prior to dropout.

FIG. 8 depicts an example 800 of an implementation in which a combined structure and style network is generated by combining a structure network and style network that are independently learned by deep learning—the deep learning involving forming a hierarchical triplet convolutional neural network by combining vectors from two sub triplet convolutional neural networks. In the context of the previously described figures, the illustrated example 800 corresponds to the combined structure and style network 124, which combines the image structure network 614 and the image style network 616.

In the illustrated example 800, anchor branch 802, positive exemplar branch 804, and negative exemplar branch 806 are depicted. These represent branches of the combined structure and style network 124 when configured as a triplet convolutional neural network, e.g., a hierarchical triplet convolutional neural network that combines vectors from style and structure streams. The illustrated example also includes images 808, 810, 812, 814. These represent an example of images that the structure and style unification module 612 may provide to the combined structure and style network 124's branches as part of training, such that the images 808, 810 are provided to the anchor branch 802, the image 812 is provided to the positive exemplar branch 804, and the image 814 is provided to the negative exemplar branch 806. The illustrated example also depicts outputs 816 of the branches. These outputs represent a concatenation of a structure feature vector with a style feature vector. In particular, the outputs are illustrated as 256-D concatenations of a 128-D structure feature vector with a 128-D style feature vector. In the illustrated example 800, each branch includes a stream from the image structure network 614 (the top portion of the branch) and a stream from the image style network 616 (the bottom portion of the branch). By unifying the image structure network 614 and the image style network 616 as described and illustrated, the structure and style unification module 612 generates the optimal combined structure and style network 124 as a joint embedding of two modalities—structure and style.

One advantage of utilizing this joint embedding of structure and style is that it allows users to express their search intent both (and independently) in terms of desired structure and in terms of desired aesthetic. In contrast to tagging images according to style and searching based on tags, utilizing the joint embedding space for visual searches enables users to have fine-grain control over the style of returned images, e.g., it allows the styles of one or more images to be blended together in a query set so that images having blended styles can be returned. The techniques described herein also enable users to specify styles for an image search without having to provide images that are styled in the desired manner and that actually include a desired object. The ability to learn structure and style discriminatively and then search for content in which structure and style are independently specified may have additional applications beyond simply image retrieval. By way of example, it may also be applicable to searching different types of content, such as audio content (e.g., music). For instance, a user may be able to submit a search query that includes a text string indicative of a desired topic (e.g., the structure) and also includes an indication of one or more selected supplemental audio content items (e.g., songs) that reflect a desired style for the returned audio content. A combined style and structure network for audio content may be configured to recognize and return audio content that is about the desired topic, but that is styled in accordance with the selected audio content items. It should be appreciated that the underlying networks e.g., the structure and style networks, may not be configured in a same manner as the described image structure and image style networks, and further may be combined using a different training process than described in connection with image content. Nevertheless, a combined style and structure network may be configured to recognize structure and styling for different types of content without departing from the spirit or scope of the techniques described herein.

Having discussed example details of the techniques for sketch and style based image retrieval in a digital medium environment, consider now some example procedures to illustrate additional aspects of the techniques.

Example Procedures

This section describes example procedures for sketch and style based image retrieval in a digital medium environment in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the service provider system 102 of FIG. 1 that makes use of an image retrieval manager module 118 or the client device 104 that makes use of the image retrieval module 114.

Figure 9:
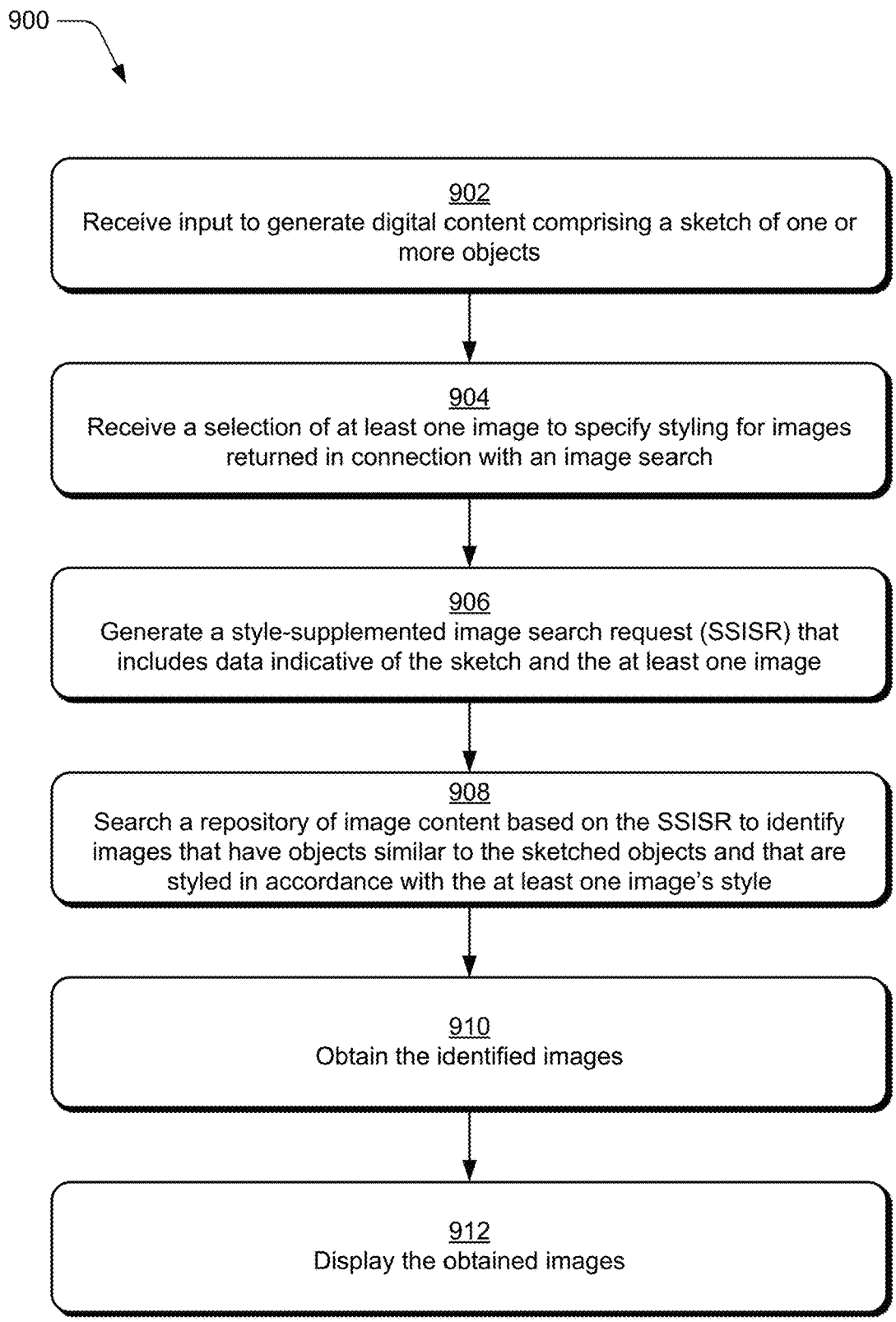
FIG. 9 depicts a procedure in an example implementation in which an image search is performed according to an image search query formed from a sketch and selected supplemental style images.

FIG. 9 depicts an example procedure 900 in which an image search is performed according to an image search query formed from a sketch and selected supplemental style images.

Input is received to generate digital content comprising a sketch of one or more objects (block 902). By way of example, the client device 104 receives input via the stylus 204 to generate the user sketch 202 of the deer. A selection of at least one image is received to specify styling for images returned in connection with an image search (block 904). By way of example, the client device 104 receives a selection of one or more of the selectable supplemental images 206, such as a selection of the images generally having the first style 208. In a scenario where the images generally having the first style 208 are selected, those images specify styling for images returned in connection an image request. A style-supplemented image search request is generated that includes data indicative of the sketch and the at least one selected image (block 906). By way of example, the image retrieval module 114 generates the style-supplemented image request 116 to include data indicative of the user sketch 202 of the deer and the images generally having the first style 208.

A repository of image content is searched based on the style-supplemented image search request to identify images that have objects similar to the sketched objects and that are styled in accordance with the at least one image's style (block 908). By way of example, the image retrieval manager module 118 searches the image content 120 based on the style-supplemented image request 116. In particular, the image retrieval manager module 118 leverages the combined structure and style network 124 to perform a visual search to identify images that have objects similar to the deer of the user sketch 202 and that are styled in accordance with the images generally having the first style 208. The watercolor deer image 214 is one example of an image having objects similar to the deer of the user sketch 202 and that is styled in accordance with the images generally having the first style 208 (watercolor).

The identified images are received (block 910). By way of example, the client device 104 receives one or more of the images identified at block 908, such as the watercolor deer image 214. For instance, these images are received over the network 108 from the content repository system 106. The received images are displayed (block 912). By way of example, the client device 104 displays the images received at block 910, including the watercolor deer image 214.

Figure 10:
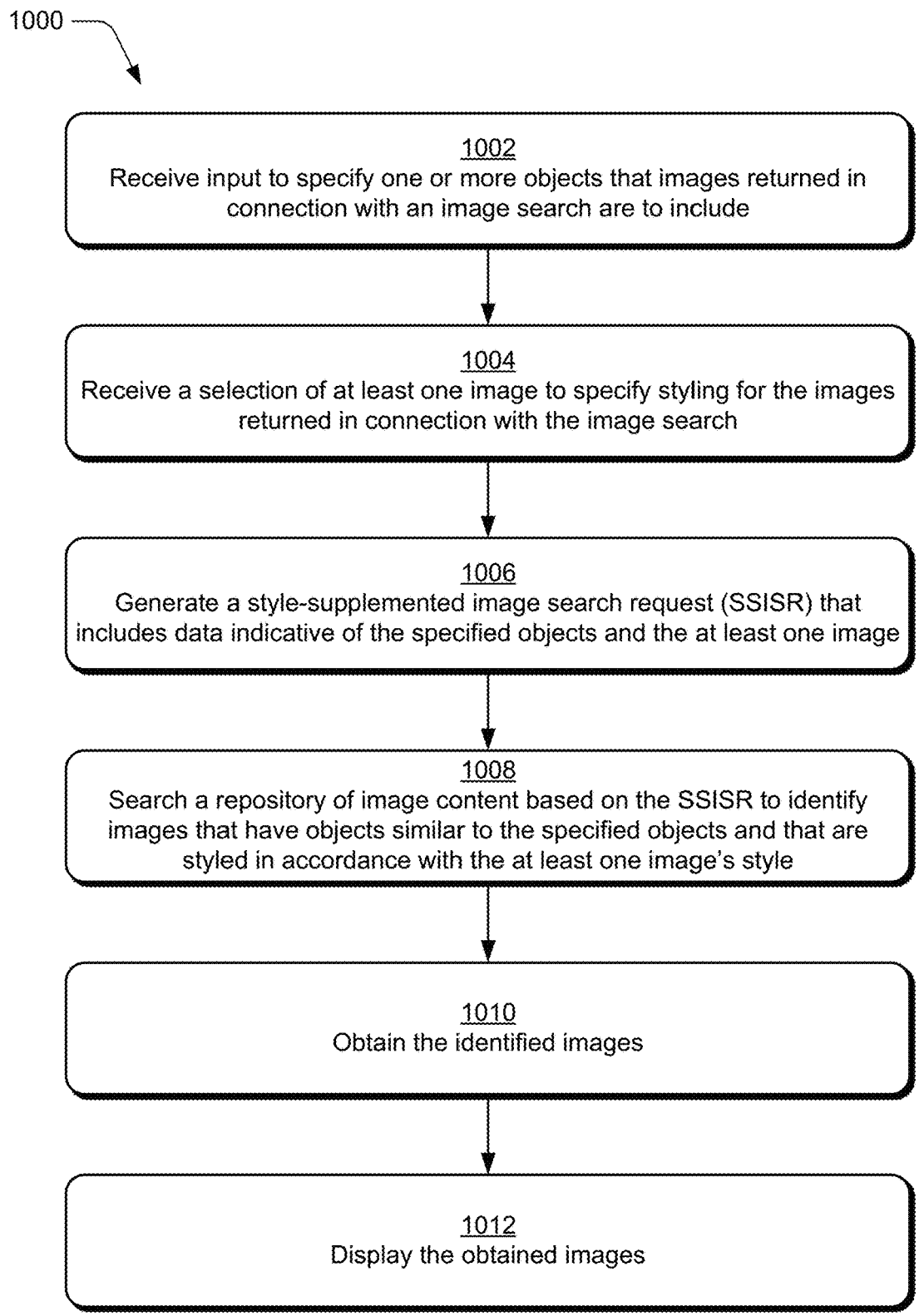
FIG. 10 depicts a procedure in an example implementation in which an image search is performed according to an image search query that is supplemented with selected supplemental style images.

FIG. 10 depicts an example procedure 1000 in which an image search is performed according to an image search query that is supplemented with selected supplemental style images. Input is received to specify one or more objects that images returned in connection with an image search are to include (block 1002). By way of example, a user of the client device 104 types a text image search query into a text box of the application 112. For instance, the user types the text string 'deer' into a text box of the application.

A selection of at least one image is received to specify styling for the images returned in connection with the image search (block 1004). By way of example, the client device 104 again receives a selection of the images generally having the first style 208. A style-supplemented image search request is generated that includes data indicative of the specified objects and the at least one selected image (block 1006). By way of example, the image retrieval module 114 generates the style-supplemented image request 116 to include data indicative of the input received at blocks 1002 and 1004, e.g., data indicative of the text string 'deer' and the images generally having the first style 208.

A repository of image content is searched based on the style-supplemented image search request to identify images that have objects similar to the specified objects and that are styled in accordance with the at least one image's style (block 1008). By way of example, the image retrieval manager module 118 searches the image content 120 based on the style-supplemented image request 116 generated at block 1006. In particular, the image retrieval manager module 118 leverages the combined structure and style network 124 to identify images that have deer (according to a semantic search of the image content) and that are styled in accordance with the images generally having the first style 208 (according to a visual search of the image content). The watercolor deer image 214 is one example of an image that has a deer and that is styled in accordance with the images generally having the first style 208 (watercolor).

The identified images are received (block 1010). By way of example, the client device 104 receives one or more of the images identified at block 1008, such as the watercolor deer image 214. The received images are displayed (block 1012). By way of example, the client device 104 displays the images received at block 1010, including the watercolor deer image 214.

Figure 11:
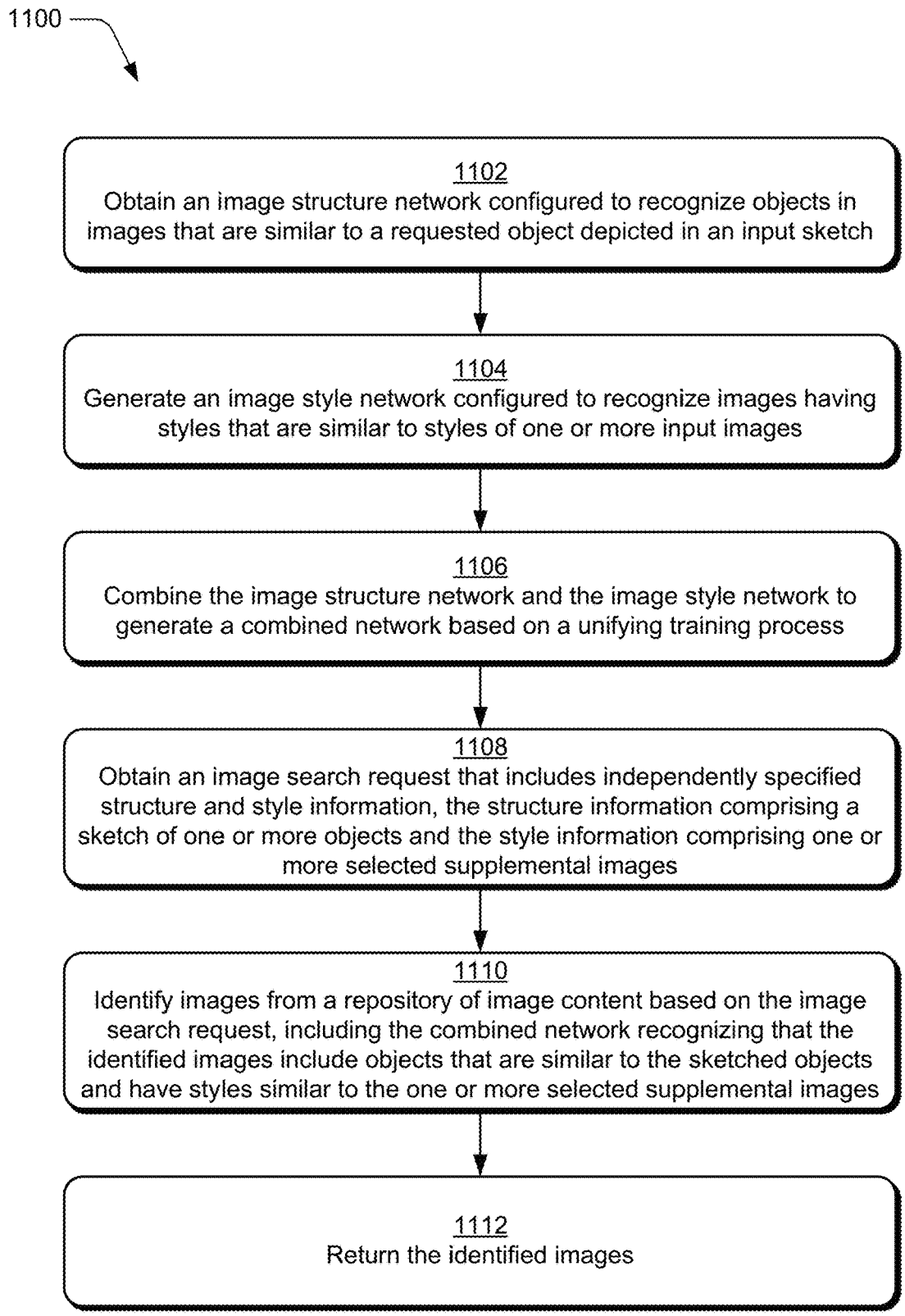
FIG. 11 depicts a procedure in an example implementation in which a network is generated that is capable of identifying a specified structure in images styled according to supplemental style information.

FIG. 11 depicts an example procedure 1100 in which a network is generated that is capable of identifying a specified structure in images styled according to supplemental style information. An image structure network is obtained that is configured to recognize objects in images that are similar to a requested object depicted in an input sketch (block 1102). By way of example, the image retrieval manager module 118 obtains the image structure network 614 from a remote computing device, such as a service provider. Alternately, the structure-learning module 608 generates the image structure network 614 based on the sketch and corresponding photo data 604. Regardless, the image structure network 614 is configured to recognize objects in images that are similar to a requested object depicted in an input sketch. For instance, the image structure network 614 is configured to recognize objects in images of the image content 120 that are similar to the deer of the user sketch 202—and to recognize those objects irrespective of a style in which expressed. The image structure network 614 can also be configured to recognize the objects that are similar to a requested object that is depicted in a non-sketch input image, such as a photographic image or some other type of artwork image that includes the desired object or objects.

An image style network is generated that is configured to recognize images having styles that are similar to styles of one or more input images (block 1104). By way of example, the style-learning module 610 generates the image style network 616 based on the artistically styled image data 606 as described in more detail above. Once generated, the image style network 616 is configured to recognize images having styles that are similar to styles of one or more input images. For instance, the image style network 616 is configured to recognize images having styles that are similar to the images generally having the first style 208—and to recognize those styles irrespective of the particular objects included in the images. In one or more implementations, the image style network 616 may be received from a remote computing device, such as a service provider.

The image structure network and the image style network are combined to generate a combined network based on a unifying training process (block 1106). By way of example, the structure and style unification module 612 combines the image structure network 614 and the image style network 616 to generate the combined structure and style network 124. In particular, the structure and style unification module 612 combines these two networks based on a training process as described in more detail above.

An image search request is received that includes independently specified structure and style information (block 1108). In accordance with the principles discussed herein, the structure information comprises a sketch of one or more objects and the style information comprises one or more selected supplemental images. By way of example, the image retrieval manager module 118 receives the style-supplemented image request 116. In this example, the structure information 302 comprises the user sketch 202 of the deer and the style information 304 comprises the images generally having the first style 208 as the selected stylized images 306.

Images are identified from a repository of image content based on the image search request (block 1110). In accordance with the principles discussed herein, this includes the combined network recognizing that the identified images include objects that are similar to the sketched objects and have styles similar to the one or more selected supplemental images. By way of example, the watercolor deer image 214 is identified from the image content 120 based on the style-supplemented image request 116. This includes the combined structure and style network 124 recognizing that the watercolor deer image 214 includes an object similar to the deer of the user sketch 202 and has a style similar to the images generally having the first style 208.

The identified images are returned (block 1112). By way of example, the content repository system 106 communicates the watercolor deer image 214 as one of the styled images 126 over the network 108 to the client device 104. In one or more implementations, the content repository system 106 may communicate the entirety of the styled images 126. Alternately or in addition, the content repository system 106 may communicate to the client device 104 representations of those images, e.g., thumbnails. The content repository system 106 may later enable users to obtain the entirety of these images.

Having described example procedures in accordance with one or more implementations, consider now an example system and device that can be utilized to implement the various techniques described herein.

Example System and Device

Figure 12:
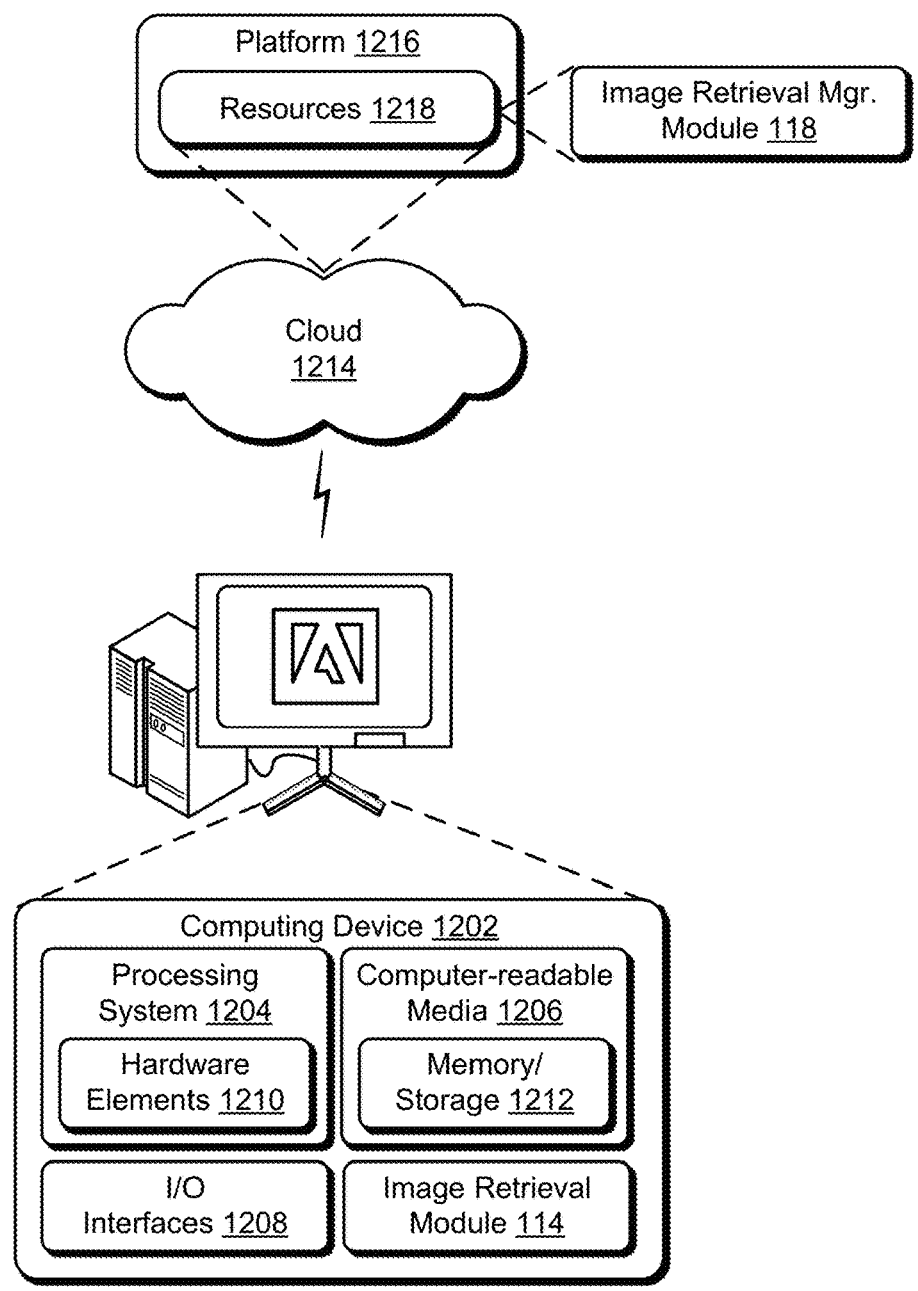
FIG. 12 illustrates an example system including various components of an example device that can be implemented as any type of computing device as described and/or utilized with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the image retrieval module 114 and the image retrieval manager module 118. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   at least one processor; and
   memory having stored thereon computer-readable instructions that are executable by the at least one processor to perform operations for presenting images received in connection with an image search that have a desired object and desired styling, the operations comprising:
   receiving data indicative of a desired object depicted in images returned in connection with an image search, the data indicative of the desired object comprising a query digital image;
   receiving a selection from a set of styled images;
   generating a style-supplemented image request that specifies the desired object and desired styling of images returned in connection with the image search, the desired object and styling specified based on inclusion of the data indicative of the desired object and data indicative of the selection;
   communicating the style-supplemented image request to a service provider configured to identify images having the desired object and styling using a convolutional neural network to recognize the desired object in images based on visual characteristics of the query digital image and independently recognize the desired styling in images based on visual characteristics of the styled images selected by the selection; and
   receiving digital content indicative of at least one image identified by the service provider as having the desired object and styling.

2. A system as described in claim 1, wherein the operations further comprise:
   receiving additional data indicative of the desired object in images returned in connection with an additional image search, the additional data indicative of the desired object comprising text;
   communicating an additional style-supplemented image request to the service provider to identify images having the desired object and styling; and
   receiving additional digital content indicative of at least one additional image identified by the service provider as having the desired object and styling.

3. A system as described in claim 2, wherein the convolutional neural network is configured to recognize the desired object in images based on semantic similarity to the text and independently recognize the desired styling in images based on visual characteristics of the styled images selected by the selection.

4. A system as described in claim 1, wherein the query digital image comprises a digital photograph.

5. A system as described in claim 1, wherein the query digital image comprises additional digital content corresponding to a sketched image.

6. In a digital medium environment to present images received in connection with an image search that have a desired object and desired styling, a method implemented by a computing device, the method comprising:
   receiving data indicative of a desired object depicted in images returned in connection with an image search, the data indicative of the desired object comprising a query digital image;
   receiving a selection from a set of styled images;
   generating a style-supplemented image request that specifies the desired object and desired styling of images returned in connection with the image search, the desired object and styling specified based on inclusion of the data indicative of the desired object and data indicative of the selection;

communicating the style-supplemented image request to a service provider configured to identify images having the desired object and styling using a convolutional neural network to recognize the desired object in images based on visual characteristics of the query digital image and independently recognize the desired styling in images based on visual characteristics of the styled images selected by the selection; and receiving digital content indicative of at least one image identified by the service provider as having the desired object and styling.

7. A method as described in claim 6, further comprising:
receiving additional data indicative of the desired object in images returned in connection with an additional search, the additional data indicative of the desired object comprising text;

communicating an additional style-supplemented image request to the service provider to identify images having the desired object and styling; and receiving additional digital content indicative of at least one additional image identified by the service provider as having the desired object and styling.

8. A method as described in claim 7, wherein the convolutional neural network is configured to recognize the desired object in images based on semantic similarity to the text and independently recognize the desired styling in images based on visual characteristics of the styled images selected by the selection.

9. A method as described in claim 6, wherein the query digital image comprises a digital photograph.

10. A method as described in claim 6, wherein the query digital image comprises additional digital content corresponding to a sketched image.

11. A method as described in claim 6, wherein the styled images selected by the selection do not depict the desired object.

12. A computer-readable storage medium having stored thereon instructions that when executed by one or more processors of a computing device, cause the computing device to perform operations including:
receiving data indicative of a desired object depicted in images returned in connection with an image search, the data indicative of the desired object comprising text;

receiving a selection from a set of styled images;

generating a style-supplemented image request that specifies the desired object and desired styling of images returned in connection with the image search, the desired object and styling specified based on inclusion of the data indicative of the desired object and data indicative of the selection;

communicating the style-supplemented image request to a service provider configured to identify images having the desired object and styling using a convolutional neural network to recognize the desired object in images based on semantic similarity to the text and independently recognize the desired styling in images based on visual characteristics of the styled images selected by the selection; and receiving digital content indicative of at least one image identified by the service provider as having the desired object and styling.

13. A computer-readable storage medium as described in claim 12, wherein the operations further comprise:
receiving additional data indicative of the desired object in images returned in connection with an additional image search, the additional data indicative of the desired object comprising a query digital image;

communicating an additional style-supplemented image request to the service provider to identify images having the desired object and styling; and receiving additional digital content indicative of at least one additional image identified by the service provider as having the desired object and styling.

14. A computer-readable storage medium as described in claim 13, wherein the convolutional neural network is configured to recognize the desired object in images based on visual characteristics of the query digital image and independently recognize the desired styling in images based on visual characteristics of the styled images selected by the selection.

15. A computer-readable storage medium as described in claim 13, wherein the query digital image comprises additional digital content corresponding to a sketched image.

16. A computer-readable storage medium as described in claim 12, wherein the styled images selected by the selection do not depict the desired object.

17. A system as described in claim 1, wherein the styled images selected by the selection do not depict the desired object.

18. A method as described in claim 6, wherein the query digital image comprises digital artwork.

19. A method as described in claim 6, wherein the query digital image comprises a vector graphic image.

20. A computer-readable storage medium as described in claim 13, wherein the query digital image comprises a digital photograph.

* * * * *